United States Patent
Ishii et al.

(10) Patent No.: US 7,928,897 B2
(45) Date of Patent: Apr. 19, 2011

(54) TARGET DETECTION METHOD FOR USE IN RADAR AND RADAR DEVICE USING THE TARGET DETECTION METHOD

(75) Inventors: Toru Ishii, Hirakata (JP); Tetsu Nishimura, Toyonaka (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 0 days.

(21) Appl. No.: 12/428,774

(22) Filed: Apr. 23, 2009

(65) Prior Publication Data

US 2009/0224960 A1 Sep. 10, 2009

Related U.S. Application Data

(63) Continuation of application No. PCT/JP2007/069954, filed on Oct. 12, 2007.

(30) Foreign Application Priority Data

Nov. 1, 2006 (JP) .................................. 2006-297475

(51) Int. Cl.
*G01S 13/58* (2006.01)
*G01S 13/00* (2006.01)
*G01S 13/32* (2006.01)
*G01S 13/93* (2006.01)

(52) U.S. Cl. .......... 342/105; 342/70; 342/104; 342/107; 342/109; 342/115; 342/118; 342/127; 342/128; 342/146; 342/147; 342/175; 342/195; 342/196

(58) Field of Classification Search .............. 342/70–72, 342/82–115, 118, 127–158, 175, 192–197
See application file for complete search history.

(56) References Cited

U.S. PATENT DOCUMENTS

| | | | | | |
|---|---|---|---|---|---|
| 2,617,093 | A | * | 11/1952 | Fyler | 342/105 |
| 5,999,117 | A | * | 12/1999 | Engel | 342/95 |
| 6,121,917 | A | * | 9/2000 | Yamada | 342/128 |
| 6,831,595 | B2 | * | 12/2004 | Isaji | 342/105 |

FOREIGN PATENT DOCUMENTS

| | | |
|---|---|---|
| JP | 10-170531 | 6/1998 |
| JP | 2000-284047 | 10/2000 |
| JP | 2003-315447 | 11/2003 |
| JP | 2003-315448 | 11/2003 |
| JP | 3575694 | 10/2004 |
| JP | 3622565 | 2/2005 |
| JP | 2005-257384 | 9/2005 |

OTHER PUBLICATIONS

PCT/JP2007/069954 International Search Report dated Oct. 25, 2007.
PCT/JP2007/069954 Written Opinion dated Oct. 25, 2007.

* cited by examiner

*Primary Examiner* — Bernarr E Gregory
(74) *Attorney, Agent, or Firm* — Dickstein Shapiro LLP

(57) ABSTRACT

A radar device includes a transmission antenna and a reception antenna having a plurality of antenna elements. The radar device switches the antenna elements in synchronization with a modulation cycle, thereby obtaining a reception signal. At this time, the radar device obtains the reception signal by switching the antenna elements using a first measurement phase and a second measurement phase having different switching cycles as one set. The radar device calculates an azimuth sine value $\sin \theta_1$ from the reception signal in the first measurement phase and also calculates an azimuth sinusoidal value $\sin \theta_2$ from the reception signal in the second measurement phase. Then, the radar device calculates a relative velocity V from the azimuth sine value $\sin \theta_1$, the azimuth sine value $\sin \theta_2$, an interval time difference $\Delta t$ between switching cycles, and an inter-antenna element spacing d.

17 Claims, 13 Drawing Sheets

TARGET DETECTION METHOD FOR USE IN RADAR AND RADAR DEVICE USING THE TARGET DETECTION METHOD

CROSS REFERENCE TO RELATED APPLICATIONS

The present application is a continuation of International Application No. PCT/JP2007/069954, filed Oct. 12, 2007, which claims priority to Japanese Patent Application No. JP2006-297475, filed Nov. 1, 2006, the entire contents of each of these applications being incorporated herein by reference in their entirety.

FIELD OF THE INVENTION

The present invention relates to target detection methods for use in a radar, and in particular, to a method for detecting a relative velocity of a target and a radar device using the target detection method.

BACKGROUND OF THE INVENTION

There are various radar devices that are mounted in, for example, the front side of a vehicle and that detect a target by transmitting a transmission wave to a predetermined detection area containing the front of the vehicle, receiving a reflected wave from the target within the detection area, and thus detecting the target. Many such radar devices employ the frequency modulated continuous-wave (FMCW) system in the vehicle field.

As illustrated in, for example, Patent Document 1 and Patent Document 2, an FMCW radar device uses a transmission signal having a triangular wave shape having alternate rising modulation sections at which the frequency of the transmission signal gradually increases and falling modulated sections at which the frequency of the transmission signal gradually decreases. The radar device calculates the beat frequency in the rising modulated section and the beat frequency in the falling modulated section. Here, the beat frequency indicates the frequency in which the frequency of a transmission signal and the frequency of a reception signal responsive to that transmission signal are mixed. The radar device calculates the relative velocity of a target from the difference between the beat frequency in the rising modulated section and the beat frequency in the falling modulated section.

[Patent Document 1] Japanese Patent No. 3622565
[Patent Document 2] Japanese Patent No. 3575694

However, the methods described in Patent Documents 1 and 2 always have to calculate the beat frequency and the Doppler frequency to calculate the relative velocity, so processing is inevitably complex.

Also, if a plurality of targets are present in a detection area, a plurality of spectrum peaks of the beat frequency exist and thus it is necessary to pair appropriate spectrums. Unfortunately, this pairing process may have an error. If an error occurs, it is difficult to accurately calculate the relative velocity.

SUMMARY OF THE INVENTION

Accordingly, it is an object of the present invention to provide a target detection method for use in a radar by which a relative velocity of a target can be detected with high precision without complex computation, such as calculation of Doppler frequency to the target to be detected, and also to provide a radar device that detects a target using that detection method.

It is another object of the present invention to provide a target detection method for use in a radar by which an azimuth of the target can also be detected substantially simultaneously with the detection of the relative velocity as described above and also to provide a radar device that detects a target using that detection method.

The present invention relates to a target detection method for use in a radar, the radar including a transmission antenna and a reception antenna, at least one of the transmission antenna and the reception antenna including a plurality of antenna elements arranged in a straight line, the target detection method switching the plurality of antenna elements arranged in the straight line in synchronization with a modulation cycle of a transmission signal, and to a radar device using the target detection method. The target detection method for use in a radar has a first measurement phase in which the plurality of antenna elements are switched at first time intervals on the basis of a preset predetermined switching pattern and a first azimuth of a target is calculated, and a second measurement phase in which the plurality of antenna elements are switched at second time intervals different from the first time intervals on the basis of the predetermined switching pattern and a second azimuth of the target is calculated. The target detection method includes calculating a relative velocity of the target on the basis of the first azimuth, the second azimuth, each of the first time intervals, each of the second time intervals, and spacing between the plurality of antenna elements.

In the case of such a radar, either one or both of a transmission antenna and a reception antenna include a plurality of antenna elements arranged in a straight line, and a target is detected while the antenna elements for performing transmission and reception are switched. Specifically, when a transmission/reception system includes a transmission antenna composed of a signal antenna element and a reception antenna in which a plurality of antenna elements are arranged in a straight line, a reflected wave based on a transmission wave from the transmission antenna is sequentially received by the antenna elements of the reception antenna whose switching is controlled, and a reception signal is generated. When a transmission/reception system includes a transmission antenna in which a plurality of antenna elements are arranged in a straight line and a reception antenna composed of a single antenna element, transmission waves are sequentially transmitted from the antenna elements of the transmission antenna whose switching is controlled, a reflected wave based on each transmission wave is received by the reception antenna, and a reception signal is generated. Moreover, when a transmission/reception system includes a transmission antenna and a reception antenna both of which include a plurality of antenna elements arranged in a straight line, transmission waves are sequentially transmitted from the antenna elements of the transmission antenna whose switching is controlled, reflected waves are sequentially received by the antenna elements of the reception antenna whose switching is controlled, thereby a reception signal is generated for each of combinations of the antenna elements of the transmission antenna and the antenna elements of the reception antenna.

In the case where a reception signal is obtained through such switching control and there exist a first measurement phase and a second measurement phase both of which the reception signal is obtained at time intervals different from each other, when the target has a relative velocity to the radar, the amount of change in phase of a reception signal in each of the phases. Because of the difference between the amounts of phase changes, azimuths obtained by, for example, the beamforming method in the phases are different. Here, the difference between time intervals (interval time difference) in the phases, the difference between azimuths in the phases, the antenna elements, and the relative velocity have a specific relationship. From this relationship, the relative velocity is calculated. Accordingly, the relative velocity can be calculated without calculation of Doppler frequency. At this time, the use of the calculated azimuth enables the true azimuth of the target to be calculated simultaneously.

The target detection method for use in a radar according to the present invention may include selecting one from one or more candidates to calculate the relative velocity of the target, the candidates being obtained using the following expression:

$$V=d\cdot(\sin\theta_1-\sin\theta_2)/(2\cdot\Delta t)+n\cdot\lambda/(2\cdot\Delta t) \quad (1)$$

where a direction perpendicular to an arrangement direction in which the plurality of antenna elements are arranged adjacent to a radiation direction of the transmission signal is 0° direction, $\theta_1$ and $\theta_2$ are the first azimuth and the second azimuth, respectively, extending from the 0° direction to the arrangement direction within a range of −90° to +90°, $\Delta t$ is an interval time difference between the first time interval and the second time interval, d is the spacing between the plurality of antenna elements, V is the candidates for the relative velocity of the target, and n is any integer.

With this method and the configuration achieving the method, the relative velocity V can be calculated by use of a simple expression, as specifically shown in expression (1).

The target detection method for use in a radar according to the present invention may include setting the interval time difference $\Delta t$ between the first time interval and the second time interval such that the following expression is satisfied:

$$\Delta t<\lambda/(2|V_{max}-V_{min}|) \quad (2)$$

where a possible relative velocity of the target to be detected is in a range of $V_{min}$ to $V_{max}$, $\Delta t$ is the interval time difference between the first time interval and the second time interval, and $\lambda$ is a wavelength of a transmission/reception signal.

With this method and the configuration achieving the method, the minimum value and the maximum value of the possible relative velocity of the target are set in advance as being $V_{min}$ and $V_{max}$. By use of expression (2), the time difference of switching intervals of the antenna elements, i.e., the interval time difference $\Delta t$ between the time interval in the first measurement phase and the time interval in the second measurement phase is determined. When the interval time difference $\Delta t$ is determined in such a way, there is one candidate within the range of $V_{min}$ to $V_{max}$ among candidates for the relative velocity. Accordingly, the relative velocity whose measurement is desired can be measured with reliability.

The target detection method for use in a radar according to the present invention may include setting the spacing between the antenna elements such that the following expression is satisfied:

$$d<\lambda/|\sin\theta_{max}-\sin\theta_{min}| \quad (3)$$

where a direction perpendicular to an arrangement direction in which the plurality of antenna elements are arranged adjacent to a radiation direction of the transmission signal is 0° direction, a detection azimuth angle range of $\theta_{min}$ to $\theta_{max}$ extending from the 0° direction to the arrangement direction is set within a range of −90° to +90°, d is the spacing between the plurality of antenna elements, and $\lambda$ is a wavelength of a transmission/reception signal.

With this method and the configuration achieving the method, the azimuth angle range for use in target detection is set in advance as being $\theta_{min}$ to $\theta_{max}$. By use of expression (3), the spacing d between the plurality of antenna elements is determined. When the spacing d between the plurality of antenna elements is determined in such a way, the relative velocity of the target within the target detection azimuth angle range whose measurement is desired can be measured with reliability, while at the same time the azimuth is uniquely detected.

The target detection method for use in a radar according to the present invention may include calculating the relative velocity and azimuth of the target in a calculation azimuth angle range specified by the following expression:

$$\theta_{cal}=\sin^{-1}(\lambda/(2d)) \quad (4)$$

where a direction perpendicular to an arrangement direction in which the plurality of antenna elements are arranged adjacent to a radiation direction of the transmission signal is 0° direction, the calculation azimuth angle range containing the 0° direction is set as a range of $-\theta_{cal}$ to $+\theta_{cal}$, d is the spacing between the plurality of antenna elements, and $\lambda$ is a wavelength of a transmission/reception signal.

With this method and the configuration achieving the method, only one spectrum peak is detected in each of the first measurement phase and the second measurement phase by the limitation of the calculation azimuth angle range $-\theta_{cal}$ to $+\theta_{cal}$ by expression (4). Accordingly, each of the first azimuth and the second azimuth for use in calculation of the relative velocity is uniquely determined, so the relative velocity can be calculated with reliability.

The target detection method for use in a radar according to the present invention may include, when the spacing d between the plurality of antenna elements is set as being smaller than 0.5λ with respect to the wavelength λ of the transmission/reception signal, virtually setting the spacing d between the plurality of antenna elements at 0.5λ or more in calculating each azimuth to calculate a virtual azimuth, and correcting the calculated azimuth so as to correspond to the state in which the spacing d between the plurality of antenna elements is set as being smaller than 0.5λ to calculate the azimuth.

When the inter-antenna element spacing d is smaller than 0.5λ, the range of a possible phase difference between the antenna elements caused by the true azimuth of the target is narrower than −λ/2 to +λ/2. Thus, depending on the relative velocity of the target, there may be a problem in which an observation peak that should appear is absent in any of the azimuth even when computation of calculation of the arrival angle is performed. That is, it is difficult to calculate the accurate azimuth in actuality from the above expressions unless the inter-antenna element spacing d is at or above 0.5λ.

Accordingly, in this method and the configuration achieving the method, the inter-antenna element spacing d is virtually set as being at or above 0.5λ in calculation of the detection azimuth, and the first azimuth and the second azimuth are calculated by the above-described method. Then, from the relationship between the set value of the inter-antenna element spacing in the calculation of the detection azimuth and the actual inter-antenna element spacing, the calculated first azimuth and second azimuth are corrected. This enables the actual first azimuth and second azimuth to be calculated, and together with this, the relative velocity is also calculated.

In the target detection method for use in a radar according to the present invention, the plurality of antenna elements are arranged at unequal intervals, and the greatest common divisor of the unequal intervals is matched to the spacing d.

With this method and the configuration achieving the method, the use of the unequal intervals at which the antenna elements are arranged extends the spacing at both ends of the antenna elements arranged and improves the azimuth resolution. Accordingly, the spectrum peak is more acute, and the first azimuth and the second azimuth are calculated with higher precision, and thus, the relative velocity is calculated with higher precision.

The target detection method for use in a radar according to the present invention may include setting the interval time difference $\Delta t$ between the first time interval and the second time interval in a variable manner.

With this method and the configuration achieving the method, even when there are a plurality of spectrum peaks, because the first azimuth and the second azimuth are associated according to the spectrum intensity, a plurality of detection azimuths can be calculated at the same time. When the target whose relative velocity is to be detected is determined, velocity resolution can also be improved.

With the present invention, the relative velocity can be readily calculated using only simple computation without complex computation, such as calculation of Doppler frequency. At this time, the azimuth can also be calculated substantially simultaneously using the same processing system.

With the present invention, the relative velocity of the target can be calculated with reliability and high precision by appropriate settings of the inter-antenna spacing and the detection azimuth angle range.

With the present invention, the load on computation of the relative velocity can be reduced by appropriate setting of the calculation azimuth angle range.

With the present invention, the relative velocity of the target can be detected with higher precision by setting of the inter-antenna spacing at unequal intervals.

With the present invention, the relative velocities of a plurality of targets can be detected at the same time.

REFERENCE NUMERALS

1: signal processor, 10: buffer memory, 11: Fourier transform processing portion, 111: temporal Fourier transform processing section, 112: beam forming section, 12: distance/relative velocity detecting portion, 13: azimuth detecting portion, 2: RF module, 21: VCO, 22: distributor, 23: output switch, 24: RF amplifier, 25: mixer, 26: IF amplifier, 3: A/D converter, 40: transmission antenna, 50: reception antenna, 51-55: antenna elements

DETAILED DESCRIPTION OF THE INVENTION

A radar device and a method for detecting a target for use in the radar device according to a first embodiment of the present invention are described with reference to the drawings. In the present embodiment, an FMCW radar device including a transmission antenna composed of a single antenna element and a reception antenna made up of a plurality of antenna elements is illustrated by way of example. In the description below, an FMCW radar device that uses a transmission signal modulated so as to have a triangular wave form having a rising modulated section at which the frequency gradually increases and a falling modulated section at which the frequency gradually decreases is illustrated by way of example. However, the configuration and processing described below are also applicable to a radar device that has only rising modulation or falling modulation.

Figure 1:
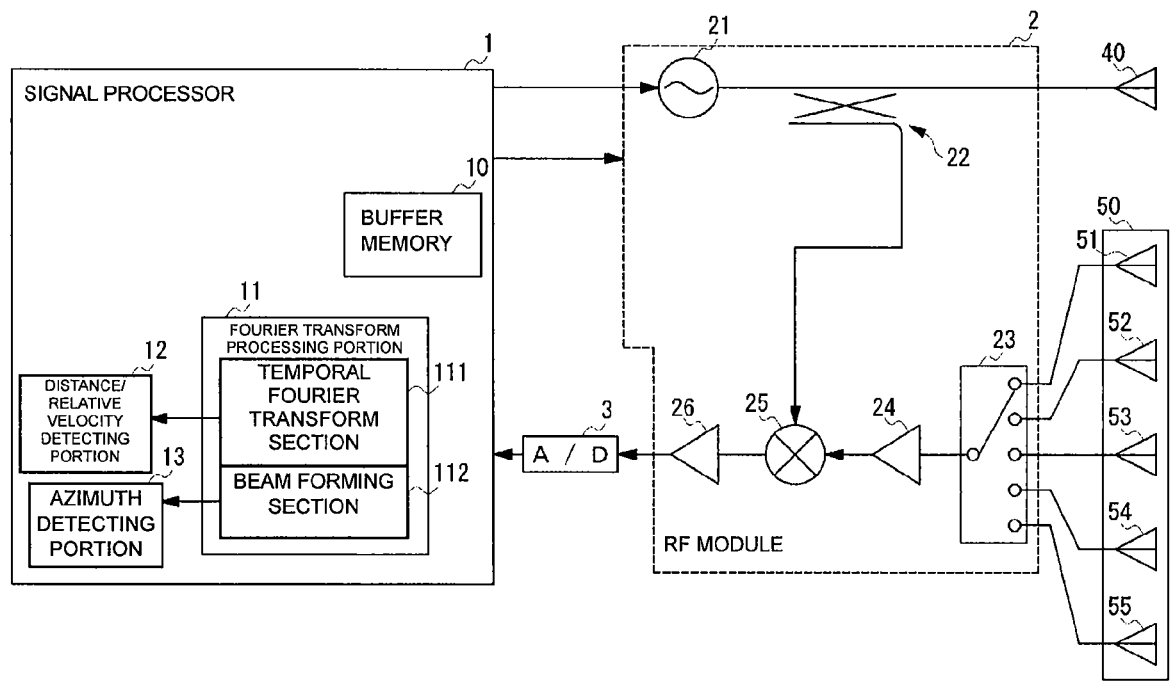
FIG. 1 is a block diagram that illustrates a schematic configuration of an FMCW radar device according to a first embodiment.

FIG. 1 is a block diagram that illustrates a schematic configuration of the FMCW radar device according to the present embodiment.

As illustrated in FIG. 1, the radar device according to the present embodiment includes a signal processor 1 performing transmission-signal control, switching control, and target detection, an RF module 2, a transmission antenna 40, and a reception antenna 50.

The signal processor 1 generates a transmission control signal and a switching control signal as a transmission system control. The transmission control signal is a signal to be supplied to a VCO 21 of the RF module 2 in order to chronologically generate a transmission signal modulated so as to have a triangular form (hereinafter referred to simply as "triangular modulated transmission signal"). The switching control signal is a signal to be supplied to an output switching circuit 23 of the RF module 2 in order to select one of antenna elements 51 to 55 of the reception antenna 50.

The signal processor 1 outputs a transmission control signal such that a transmission signal is generated in a first measurement phase and a second measurement phase having different transmission cycles. At this time, a generated triangular modulated transmission signal is composed of triangular modulated sections, in which a signal is modulated so as to have a triangular form, and unmodulated sections between the triangular modulated sections. The time length of each of the triangular modulated sections in the first measurement phase is set to be equal to that in the second measurement phase. The time length of each of the unmodulated sections in the second measurement phase is set to be longer than that in the first measurement phase.

Figure 2A:
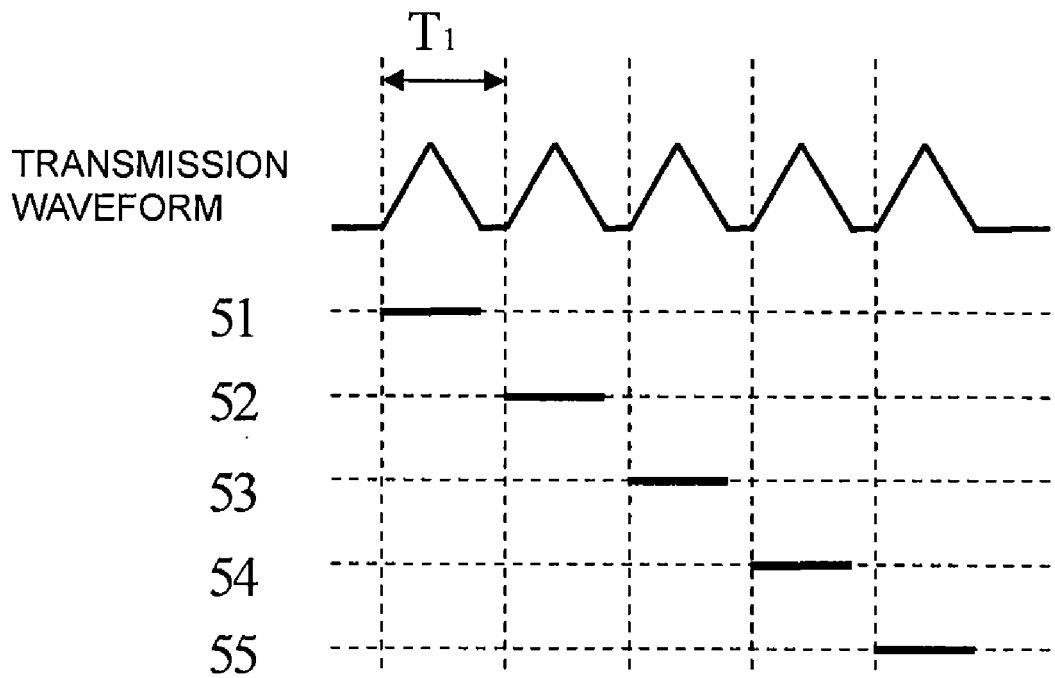
FIGS. 2(A) and 2(B) are illustrations that shows a synchronization state between transmission control and switching control.
Figure 2B:
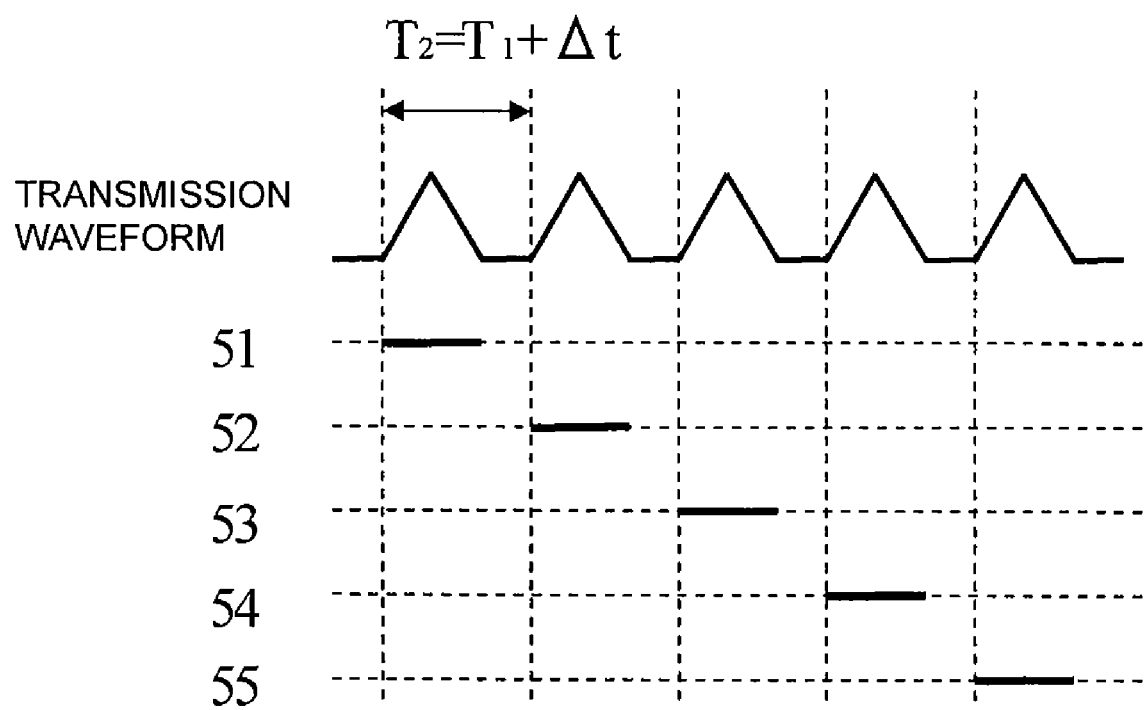

FIGS. 2(A) and 2(B) are illustrations that show a synchronization state between transmission control and switching control; FIG. 2(A) illustrates a first measurement phase in which the antenna element is switched with a switching time $T_1$ and FIG. 2(B) illustrates a second measurement phase in which the antenna element is switched with a switching time $T_2$. The switching time $T_2$ of the second measurement phase is the time in which a predetermined time $\Delta t$ is added to the switching time $T_1$ of the first measurement phase. That is, a relationship of $T_2 = T_1 + \Delta t$ exists.

Substantially simultaneously with such transmission control processing, the signal processor 1 outputs a switching control signal matching a rising timing in each of triangular modulated sections with a switching timing for the antenna elements 51 to 55 such that the antenna elements 51 to 55 are sequentially associated with the triangular modulated sections.

At this time, a switching pattern for the antenna elements 51 to 55 is composed of a preset pattern that is the same in the first measurement phase and the second measurement phase. For example, as illustrated in FIGS. 2(A) and 2(B), a switching pattern that repeats, in chronological order, from the antenna element 51 to the antenna element 52 to the antenna element 53 to the antenna element 54 to the antenna element 55 is used. The transmission pattern of the transmission signal and the switching pattern for the antenna elements are not limited to the above examples. They may be various repeating patterns described in the end of the description of the embodiments in this specification.

The RF module 2 includes the VCO 21 and a distributor 22 as transmission system circuitry and also includes the output switching circuit 23, an RF amplifier 24, a mixer 25, and an intermediate-frequency (IF) amplifier 26 as reception system circuitry.

The VCO 21 serving as the transmission system circuitry of the RF module 2 is made up of what is called a voltage-controlled oscillator. The VCO 21 generates a triangular modulated transmission signal in response to a transmission control signal from the signal processor 1 and output it to the distributor 22.

The distributor 22 is composed of a directional coupler. The distributor 22 supplies a triangular modulated transmission signal output from the VCO 21 to the transmission antenna 40 and also generates a local signal in which the power of the triangular modulated transmission signal is distributed and supplies it to the mixer 25.

The transmission antenna 40 is composed of, for example, a single patch antenna and emits a transmission wave in which a triangular modulated transmission signal is converted into a radio wave into a detection area.

The reception antenna 50 includes the antenna elements 51 to 55. Each of the antenna elements 51 to 55 is composed of, for example, a patch antenna and is composed of, for example, a plurality of patch electrodes arranged in a straight line at regular intervals on a dielectric substrate. The direction in which the antenna elements 51 to 55 are arranged is perpendicular to the direction of the front of the radar device (the direction of the front of a vehicle in which the radar device is mounted) and arranged along the horizontal direction. In the present embodiment, a more specific positional relationship is provided in which the antenna elements 51, 52, 53, 54, and 55 are arranged in sequence from the right end to the left end viewed from the front of the radar device.

Each of the antenna elements 51 to 55 of the reception antenna 50 receives, for example, a reflection wave from a target based on a transmission wave, generates a reception signal, and outputs it to the output switching circuit 23 of the RF module 2.

The output switching circuit 23 serving as the reception system of the RF module 2 receives a reception signal from each of the antenna elements 51 to 55. The output switching circuit 23 has a supplied switching control signal, which is previously described, and switches connection between the RF amplifier 24 and one of the antenna elements 51 to 55 in accordance with that switching control signal. That is, the reception signal from an antenna element selected in accordance with the switching control signal is supplied to the RF amplifier 24. At this time, switching the antenna elements is performed according to the transmission cycle $T_1$ in a first measurement phase and according to the transmission cycle $T_2$ in a second measurement phase. A reception signal of an antenna element output for each of the above-described triangular modulated sections is supplied to the RF amplifier 24.

The RF amplifier 24 performs gain control on a supplied reception signal and outputs an RF signal acquired by the gain control to the mixer 25.

The mixer 25 the RF signal and a local signal together to generate an IF beat signal and supplies the IF beat signal to the IF amplifier 26. The IF amplifier 26 performs gain control on the IF beat signal and outputs it to an A/D converter 3.

The A/D converter 3 samples the IF beat signal amplified (subjected to the gain control) at a predetermined sampling cycle, thereby converting the analog IF beat signal into a digital IF beat signal. The A/D converter 3 outputs the digital IF beat signal to the signal processor 1.

A buffer memory 10 serving as the reception system of the signal processor 1 sequentially buffers an input IF beat signal. At this time, the IF beat signal is buffered in the buffer memory 10 in units of measurement phases.

A Fourier transform processing portion 11 includes a temporal Fourier transform processing section 111 and a beam forming section 112. The temporal Fourier transform processing section 111 generates a frequency spectrum using known fast Fourier transform (FFT) and supplies it to a distance/relative velocity detecting portion 12. The beam forming section 112 generates a directional spectrum by the Capon method or Beamformer method using the frequency spectrum and supplies it to an azimuth detecting portion 13. At this time, the Fourier transform processing portion 11 generates the directional spectrum in units of measurement phases.

The distance/relative velocity detecting portion 12 calculates a relative velocity of a target to be detected with respect to the radar device using a method described below.

[Description of Principle of Detection of Relative Velocity]

The radar device according to the present embodiment detects a relative velocity of a target on the basis of the principle below.

Figure 3:
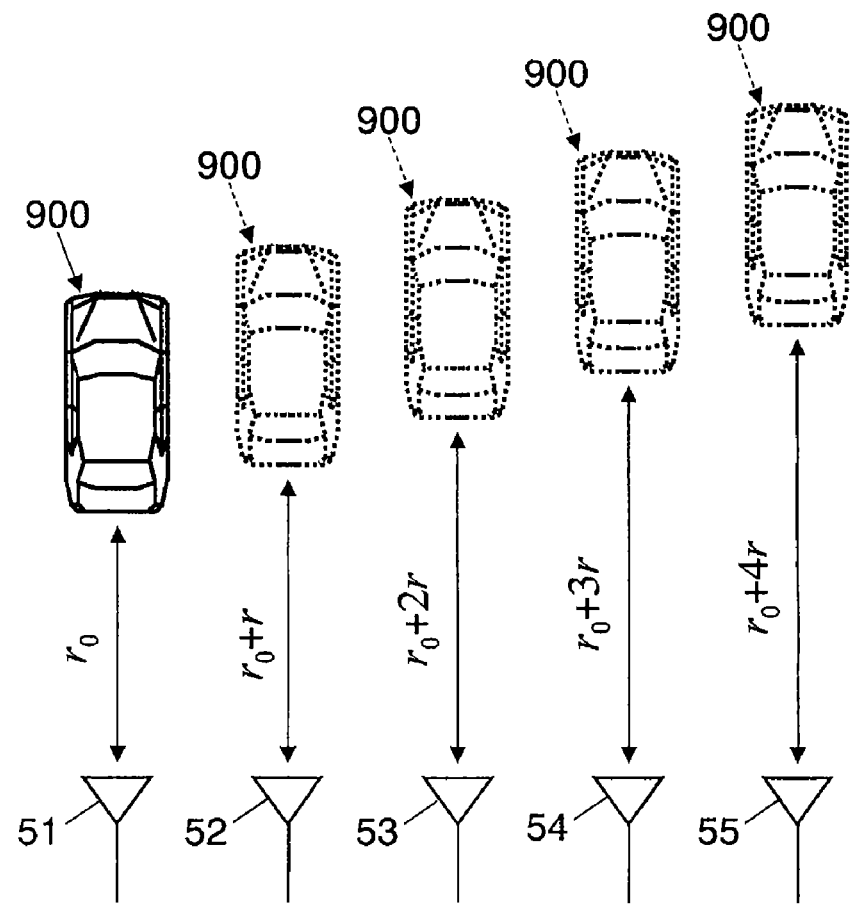
FIG. 3 illustrates a change in distance to a target in accordance with a relative velocity.
Figure 3:
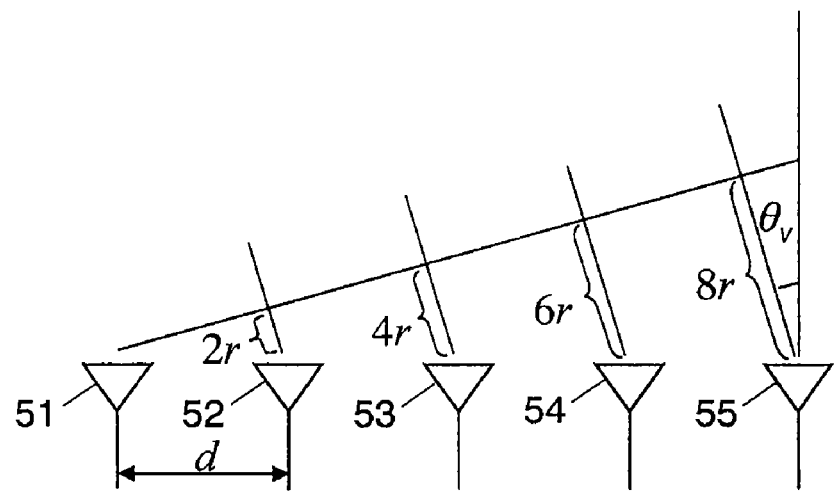

FIGS. 3, 4(A), 4(B), 5(A), 5(B), 6 and 7 are illustrations for describing the principle of detection of the relative velocity of a target. FIG. 3 illustrates a change in distance to the target in accordance with the relative velocity. In FIG. 3, d represents the distance between the antenna elements, $r_0$ represents the distance between a target 900 and the antenna element 51 when an output of the reception signal of the antenna element 51 is selected, and r represents the amount of change in distance in accordance with the relative velocity according to an antennal switching cycle.

As illustrated in FIG. 3, in the case where the target 900 moves with constant speed, not "0", in a straight line with respect to the radar device, when the distance for selection of the antenna element 51 is $r_0$, in one measurement phase, the distance for selection of the antenna element 52 is $r_0+r$, the distance for selection of the antenna element 53 is $r_0+2r$, the distance for selection of the antenna element 54 is $r_0+3r$, and the distance for selection of the antenna element 55 is $r_0+4r$. Thus, it is equal to an equiphase wave surface generated in a direction of $\theta_V = \sin^{-1}(2r/d)$, where the front direction of the reception antenna 50 is zero, the azimuth angle in accordance with the relative velocity is $\theta_V$, and the distance between the antenna elements is d. This corresponds to a shift of the azimuth angle in accordance with the relative velocity in a measurement phase.

Figure 4A:
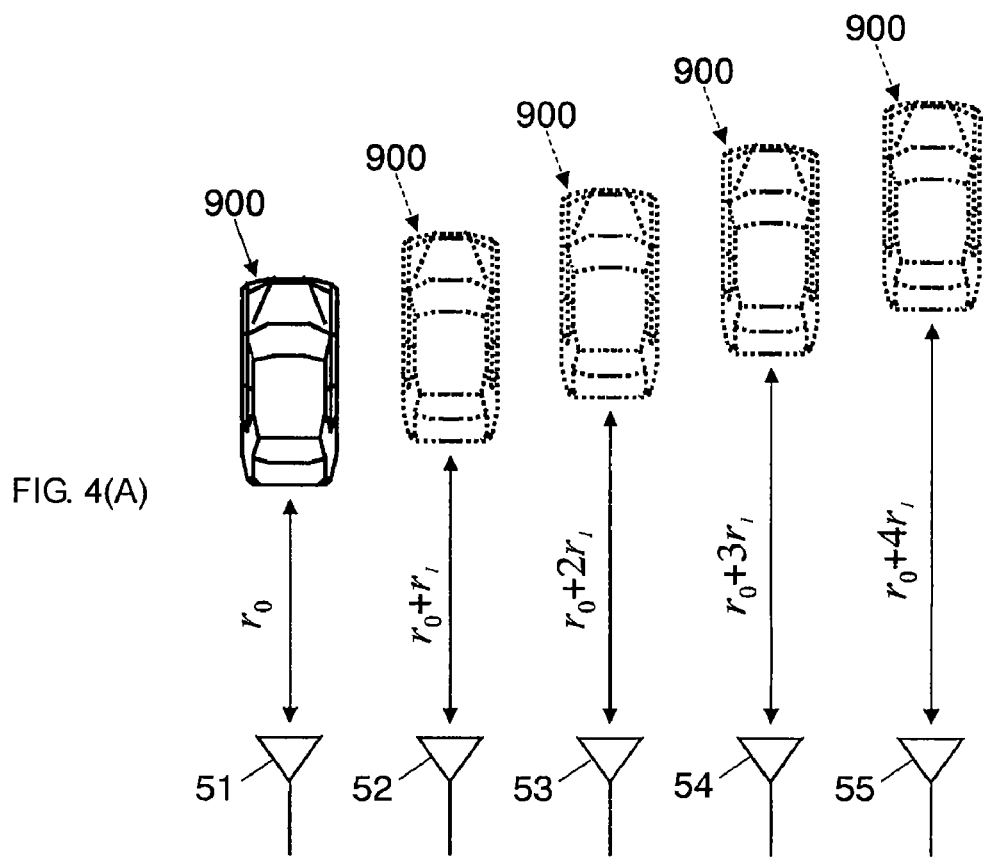
FIGS. 4(A) and 4(B) illustrate a change in distance to a target in accordance with a relative velocity in a first measurement phase and a change in distance to the target in accordance with a relative velocity in a second measurement phase.
Figure 4B:
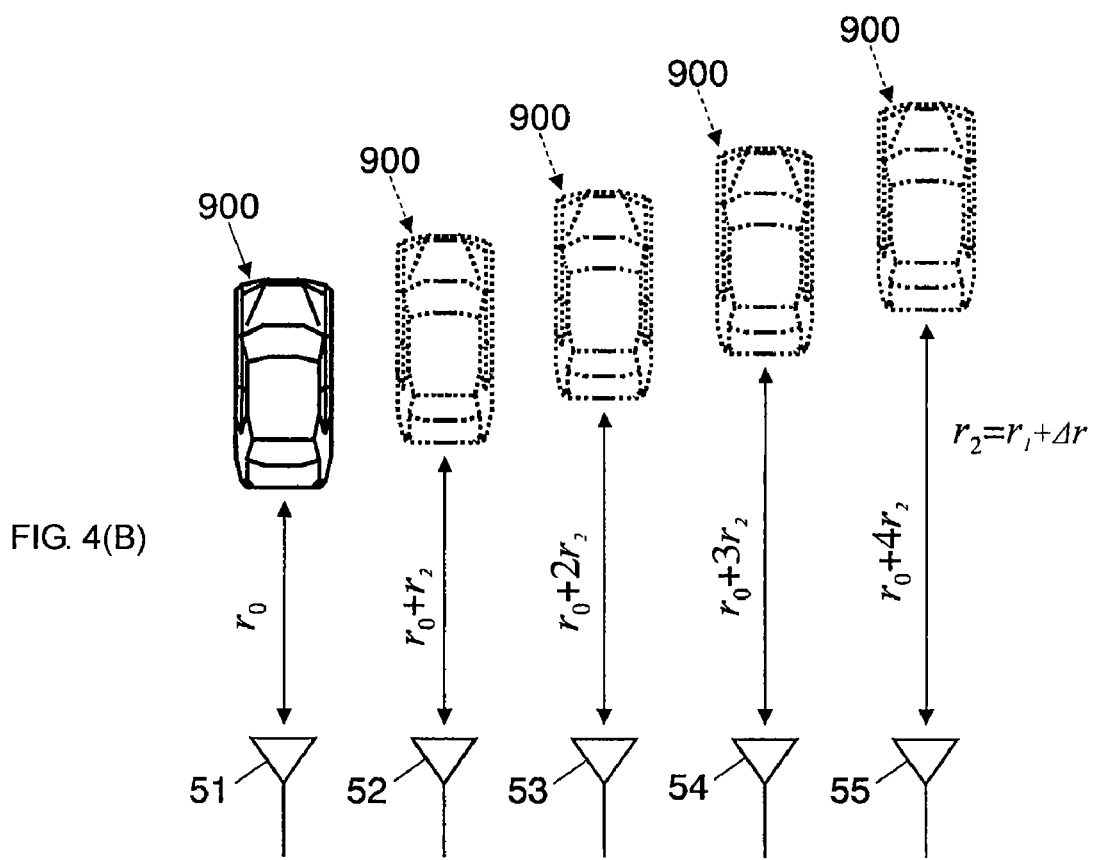

In such a case, when a first measurement phase (transmission cycle $T_1$) and a second measurement phase (transmission cycle $T_2$) have different transmission cycles (switching cycles), the distances for selections of the antenna elements have a phase relationship illustrated in FIGS. 4(A) and 4(B).

FIG. 4(A) is an illustration that shows a change in distance to the target in accordance with the relative velocity in a first measurement phase; FIG. 4(B) is an illustration that shows a change in distance to the target in accordance with the relative velocity in a second measurement phase.

As illustrated in FIG. 4(A), in the first measurement phase, the distance varies on an $r_1$ basis according to the transmission cycle $T_1$. Specifically, when the distance for selection of the antenna element 51 is $r_0$, the distance for selection of the antenna element 52 is $r_0+r_1$, the distance for selection of the antenna element 53 is $r_0+2r_1$, the distance for selection of the antenna element 54 is $r_0+3r_1$, and the distance for selection of the antenna element 55 is $r_0+4r_1$.

As illustrated in FIG. 4(B), in the second measurement phase, the distance varies on an $r_2$ basis according to the transmission cycle $T_2$. Specifically, when the distance for selection of the antenna element 51 is $r_0$, the distance for selection of the antenna element 52 is $r_0+r_2$, the distance for selection of the antenna element 53 is $r_0+2r_2$, the distance for selection of the antenna element 54 is $r_0+3r_2$, and the distance for selection of the antenna element 55 is $r_0+4r_2$. Here, $r_2=r_1+\Delta r$, where $\Delta r$ is the difference in distance according to the difference $\Delta t$ in time length between the transmission cycles $T_1$ and $T_2$.

Figure 5A:
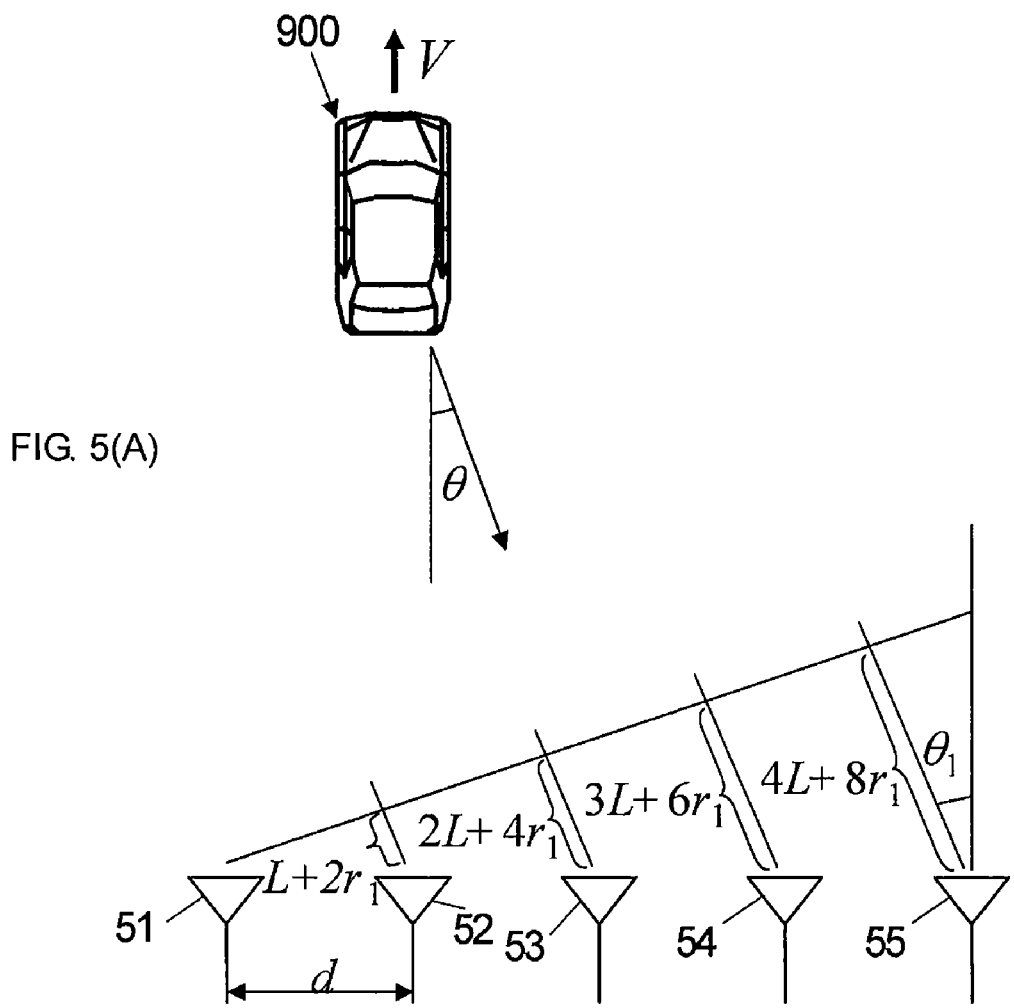
FIGS. 5(A) and 5(B) illustrate a change in distance to a target in a first measurement phase and a change in distance to the target in a second measurement phase.
Figure 5B:
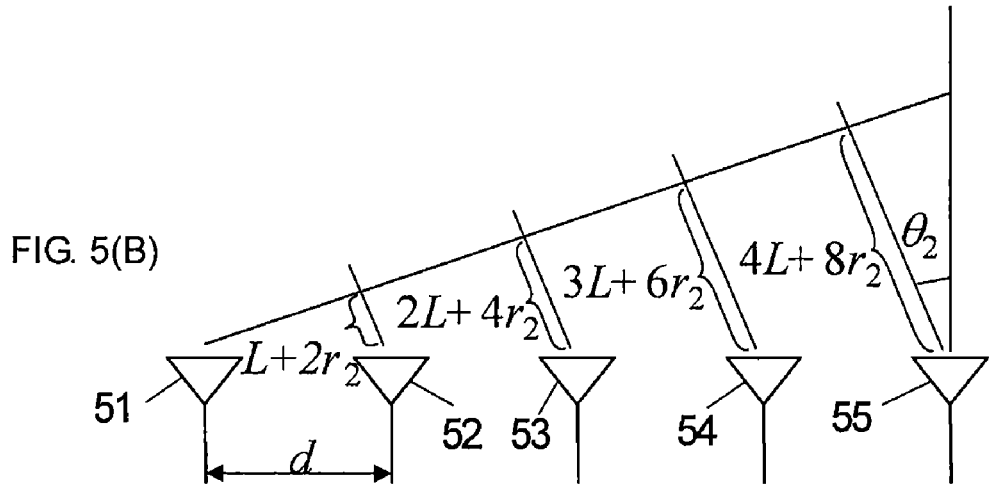

When the change in distance in accordance with a velocity of a target among the antenna elements in such a manner, a change in distance in accordance with an azimuth of the target to the radar device and a change in distance between the radar device and the target has a relationship illustrated in FIGS. 5(A) and 5(B).

FIG. 5(A) is an illustration that shows a change in a round-trip distance from the radar device to the target in a first measurement phase. FIG. 5(B) is an illustration that shows a change in a round-trip distance from the radar device to the target in a first measurement phase.

In a first measurement phase, as specifically illustrated in FIG. 5(A), when the distance from the antenna element 51 to a virtual phase reference plane is "0," the distances from the antenna elements 52, 53, 54, and 55 to the virtual phase reference plane are $L+2r_1$, $2L+4r_1$, $3L+6r_1$, and $4L+8r_1$, respectively. Here, L is the change in distance in accordance with the azimuth $\theta$ of the target, and $2r_1$ is the change in distance in accordance with the velocity V of the target.

In a second measurement phase subsequent to the first measurement phase, as specifically illustrated in FIG. 5(B), when the distance from the antenna element 51 to a virtual phase reference plane is "0," the distances from the antenna elements 52, 53, 54, and 55 to the virtual phase reference plane are $L+2r_2$, $2L+4r_2$, $3L+6r_2$, and $4L+8r_2$, respectively. Here, L is the change in distance in accordance with the azimuth $\theta$ of the target, and $2r_2$ is the change in distance in accordance with the velocity V of the target.

This relationship provides, where a first azimuth calculated in the first measurement phase is $\theta_1$, a second azimuth calculated in the second measurement phase is $\theta_2$, the true azimuth unaffected by the relative velocity is $\theta$, a shift in azimuth in the first measurement phase with respect to the true azimuth $\theta$ is $\theta_{r1}$, and a shift in azimuth in the second measurement phase with respect to the true azimuth $\theta$ is $\theta_{r2}$, two expressions given below.

$$L+2r_1 = -d(\sin\theta + \sin\theta_{r1}) = -d\cdot\sin\theta_1 \quad (5)$$

$$L+2r_2 = -d(\sin\theta + \sin\theta_{r2}) = -d\cdot\sin\theta_2 \quad (6)$$

For the sign of the azimuth, the direction of $\theta_1$ and $\theta_2$ illustrated in FIG. 5 is defined as negative.

When it is defined that $\Delta r = r_2 - r_1$,

[Expression 1]

$$\frac{\Delta r}{\Delta t} = \frac{d}{2\Delta t}(\sin\theta_1 - \sin\theta_2) \quad (7)$$

This expression (7) is, that is, the first term itself in the right-hand side of the previously described expression (1), which represents a relative-velocity candidate V. Performing this computation enables the relative-velocity candidate V of the target to be calculated.

The signal processor 1 calculates the above relative-velocity candidate V using a process flow described below.

First, the signal processor 1 calculates a directional spectrum from a group of reception signals in a first measurement phase and calculates the sine value $\sin\theta_1$ for the azimuth angle $\theta_1$. Next, the signal processor 1 calculates a directional spectrum from a group of reception signals in a second measurement phase subsequent to the first measurement phase and calculates the sine value $\sin\theta_2$ for the azimuth angle $\theta_2$. Then, the signal processor 1 applies the calculated $\sin\theta_1$ and $\sin\theta_2$ in expression (1), thereby calculating the relative-velocity candidate V.

Figure 6:
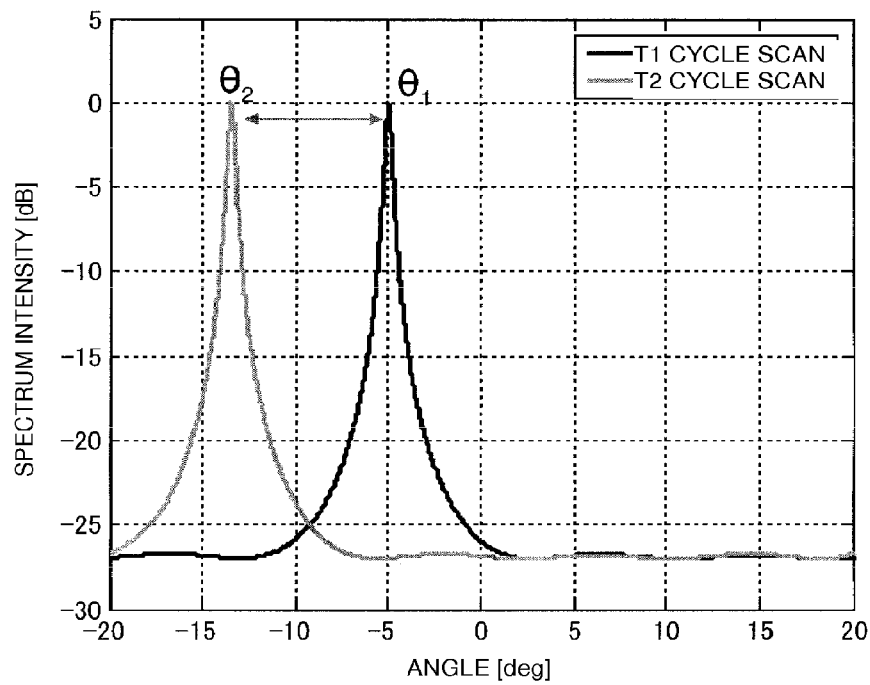
FIG. 6 illustrates a directional spectrum of a reception signal in the first measurement phase and a directional spectrum of the reception signal in the second measurement phase.

The directional spectrums are illustrated in FIG. 6 in one specific example of a simulation performed using the Capon method where the number of the reception antenna elements is 5, the distance between the antenna elements is 1.46λ (λ is the wavelength of a transmission signal of 76 GHz), the antenna switching cycle $T_1$ in a first measurement phase is 1 msec, the antenna switching cycle $T_2$ in a second measurement phase is 1.05 msec, the target's azimuth 5°, and the relative velocity of the target is 30 km/h. FIG. 6 illustrates the directional spectrum in accordance with a reception signal in the above-described first measurement phase and the directional spectrum in accordance with a reception signal in the above-described second measurement phase. In FIG. 6 and its subsequent drawings, $T_1$ cycle scan in the drawings represents behavior in the first measurement phase and $T_2$ cycle scan in the drawings represents behavior in the second measurement phase.

As illustrated in FIG. 6, the azimuth θ₁ in the first measurement phase at which the antenna elements 51, 52, 53, 54, and 55 are sequentially selected at the switching cycle T₁ is −5.00° and the azimuth θ₂ in the second measurement phase at which the antenna elements 51, 52, 53, 54, and 55 are sequentially selected at the switching cycle T₂ is −13.470. Therefore, from expression (1), the calculated relative-velocity candidate is 30.0±141.1×n km/h, and its value when n=0 is the same as the assumption of the simulation. If a possible velocity of the target ranges between −40 km/h and 100 km/h, the true relative velocity can be identified as 30 km/h.

In such a way, the use of the configuration and the processing according to the present embodiment enables the relative velocity of the target to be accurately detected with reliability without the performance of complex processing, such as calculation of a Doppler frequency of the target. Also, because processing operation is simple, the high-precision detection can be made at high speed.

Figure 7:
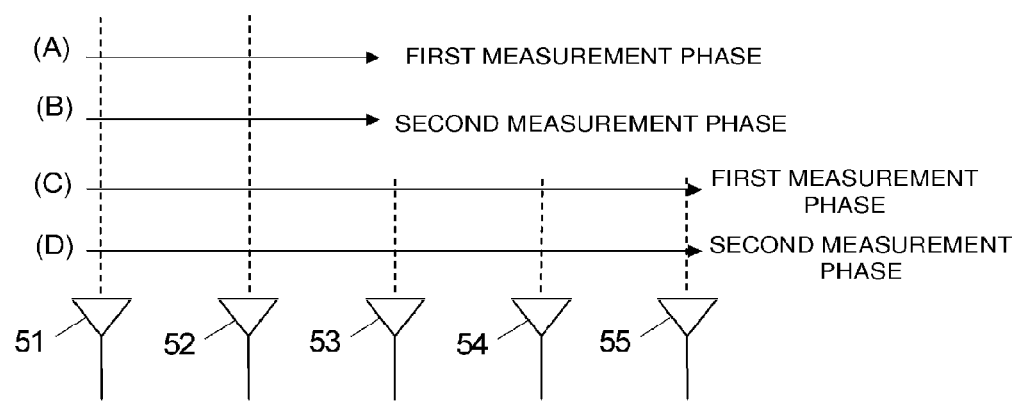
FIG. 7 illustrates a switching pattern for each switching mode of antenna elements.

In the foregoing description, the first measurement phase and the second measurement phase are formed using all of the antenna elements 51 to 55 consisting of the reception antenna. However, it is not necessarily required to switch all of the antenna elements from one end to the other end in antenna arrangement. As illustrated in FIG. 7, a pattern in which a part of the antenna elements are switched may be used. (A) to (D) of FIG. 7 are illustrations that show a switching pattern for each switching mode of the antenna elements; (A) and (B) of FIG. 7 illustrate a high-speed detection mode and (C) and (D) of FIG. 7 illustrate a normal detection mode.

The signal processor 1 has the function of switching mode. The signal processor 1 switches the mode, for example, in response to an input from operation of a user. Here, the mode can include, for example, a high-speed detection mode in which the relative velocity is detected at high speed and a normal detection mode in which the relative velocity is detected in a normal detection time. When receiving selection of the high-speed detection mode, the signal processor 1 detects the relative velocity from the first measurement phase illustrated in (A) of FIG. 7 and the second measurement phase illustrated in (B) of FIG. 7. That is, first, for the first measurement phase, the three antenna elements 51 to 53 are switched at the switching cycle T₁, and the first azimuth θ₁ is calculated. After that, for the second measurement phase, the three antenna elements 51 to 53 are switched at the switching cycle T₂, and the second azimuth θ₂ is calculated. Then, the relative velocity V is calculated using these first azimuth θ₁ and second azimuth θ₂. With this process, because the number of switched antenna elements is small, the relative velocity can be detected faster than that in the normal detection mode.

When receiving selection of the normal detection mode, the signal processor 1 detects the relative velocity from the first measurement phase illustrated in (C) of FIG. 7 and the second measurement phase illustrated in (D) of FIG. 7. That is, first, for the first measurement phase, all of the antenna elements 51 to 55 are switched at the switching cycle T₁, and the first azimuth θ₁ is calculated. After that, for the second measurement phase, all of the antenna elements 51 to 55 are switched at the switching cycle T₂, and the second azimuth θ₂ is calculated. Then, the relative velocity V is calculated using these first azimuth θ₁ and second azimuth θ₂. With this process, because the number of switched antenna elements is larger that that in the high-speed detection mode, the relative velocity can be detected more accurately than that in the high-speed detection mode.

In the foregoing description, the time range of the switching interval difference Δt for the antenna elements is not specified. However, the difference Δt in switching interval can be set by the method described below. In this case, the relative-velocity candidate V appearing in the range of the possible relative velocity of the target is unique. Accordingly, the relative velocity can be calculated without ambiguity.

When the relative velocity of the target becomes large, the difference Δr in distance to the time difference (switching interval difference) Δt between the switching cycle T₁ for the first measurement phase and the switching cycle T₂ for the second measurement phase also becomes large. The phase difference according to the round-trip distance difference 2Δr occurs between the first measurement phase and the second measurement phase. At this time, where the wavelength of a transmission signal is λ, when the phase difference according to the distance difference 2Δr is present within the range of −λ/2 to +λ/2, there are no ambiguities and thus the relative velocity V can be calculated with reliability. That is, it is merely necessary that the absolute value of the phase difference in accordance with 2Δr does not exceed λ/2. Here, the relative-velocity candidate V appears at intervals of λ/(2Δt). Therefore, where the maximum relative-velocity candidate in the range of candidates of the relative velocity V is $V_{max}$ and the minimum relative-velocity candidate is $V_{min}$, the relative-velocity candidate is uniquely determined in the case where the following condition is satisfied.

[Expression 2]

$$|V\max - V\min| < \frac{\lambda}{2\Delta t} \quad (8)$$

Accordingly, the relative velocity can be uniquely calculated more reliably by use of the switching interval difference Δt given by:

[Expression 3]

$$\Delta t < \frac{\lambda}{2|V\max - V\min|} \quad (9)$$

Once the target has been detected, a rough estimate is obtainable. When the relative velocity of the target obtained in the previous measurement is $V_{prv}$, the maximum acceleration possible in nature of motion of the target is α, the deceleration is −β, and the time difference between the previous measurement and the current measurement path is τ, the maximum value $V_{max}$ of the velocity of the target possible at the time of the current measurement and the minimum value $V_{min}$ thereof can be represented by $V_{prv}+\alpha\tau$ and $V_{prv}-\beta\tau$, respectively. Accordingly, the following expression can be established.

$$|V_{max}-V_{min}|=(V_{prv}+\alpha\tau)-(V_{prv}-\beta\tau)=(\alpha+\beta)\tau \quad (9')$$

Here, a specific method for setting Δt is described. First, when the target is undetected, in the case where the target is, for example, a vehicle, it is necessary that $V_{max}=+200$ km/h, $V_{min}=-200$ km/h, the maximum acceleration α=5 m/s², the maximum deceleration β=10 m/s², the time difference τ=0.1 sec, and the switching interval difference Δt=1 msec from expressions (9) and (9').

Setting the switching interval difference Δt in such a way enables the relative velocity V to be calculated with more reliability.

In addition, when the inter-antenna element spacing d is at or above 0.5λ, the relative velocity and azimuth of the target can be detected with reliability.

Figure 8A:
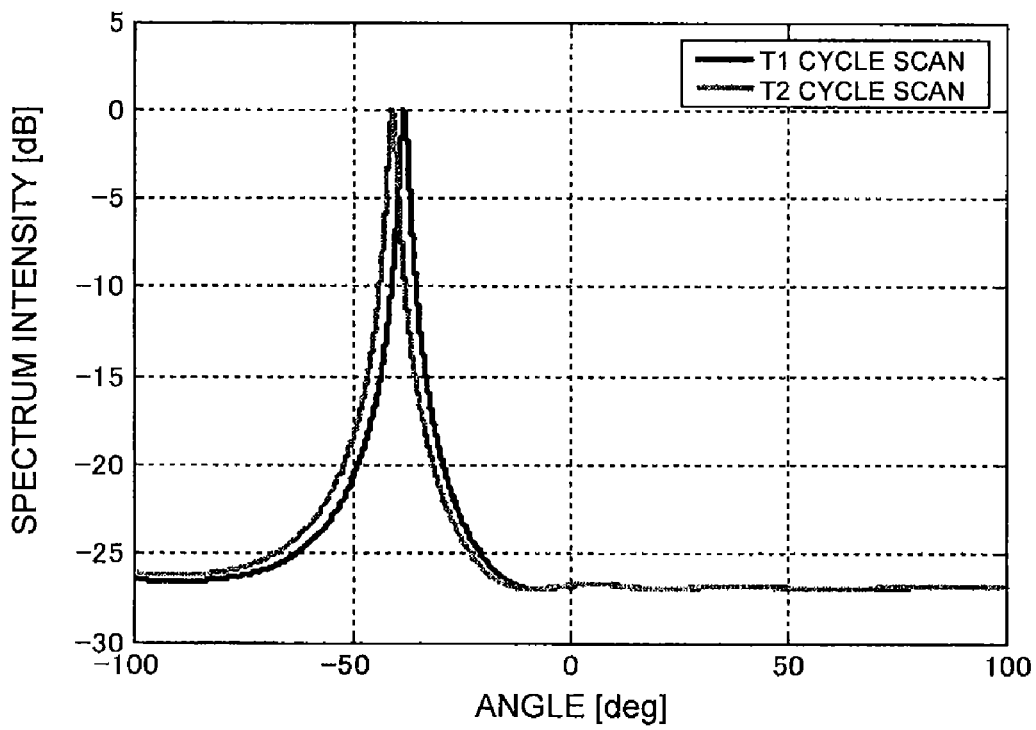
FIGS. 8(A) and 8(B) illustrate a directional spectrum.
Figure 8B:
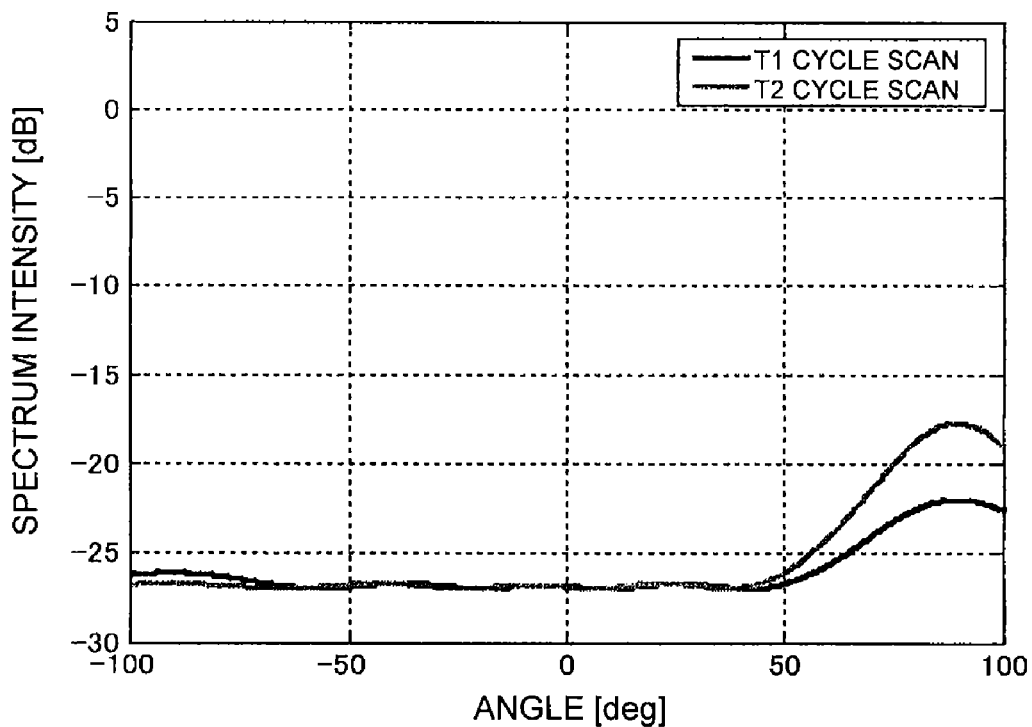

FIGS. 8(A) and 8(B) are illustrations that show a directional spectrum when the inter-antenna element spacing d=0.4λ and the true azimuth of the target is 5°; FIG. 8(A) illustrates the case where the relative velocity of the target is 2.0 km/h and 8(B) illustrates the case where the relative velocity of the target is 4.0 km/h.

When the inter-antenna element spacing is d, the detection range of the distance difference occurring between the neighboring antenna elements is −d+nλ to +d+nλ (n is an integer). That is, if the distance difference in which the distance difference in accordance with the positional relationship between the antenna element and the target and the distance difference in accordance with the relative velocity are added together is in the range of −d+nλ to +d+nλ, the peak of the directional spectrum illustrated in FIG. 6 described above is unobtainable.

Here, if the inter-antenna element spacing d is below 0.5λ (d=0.4λ), for example, the detection range of the distance difference is −0.4λ+nλ to 0.4λ+nλ. When the switching cycle $T_1$ in a first measurement phase is 1 msec, the switching cycle $T_2$ in a second measurement phase is 1.05 msec, and the relative velocity of the target is 2 km/h, the distance difference between the neighboring antenna elements is 0.32λ. In this case, because the foregoing condition −0.4λ+nλ to 0.4λ+nλ is satisfied, the spectrum peak is obtainable (see FIG. 8(A)) and the relative velocity is detectable.

However, when the relative velocity of the target is 4 km/h, the distance change between the neighboring antenna elements in accordance with the relative velocity is 0.60λ. In this case, because the foregoing condition −0.4λ+nλ to 0.4λ+nλ is not satisfied, the spectrum peak is unobtainable (see FIG. 8(B)), the relative velocity cannot be detected accurately.

When the inter-antenna element spacing d is at or above 0.5λ, for example, d=0.8λ, the detection range of the distance difference between the neighboring antenna elements is (−0.8+n)λ to (0.8+n)λ. In this case, because the range when n=m overlaps the range when n=m+1, all distance differences are detectable. That is, the distance difference in which the distance difference in accordance with the positional relationship between the antenna element and the target and the distance difference in accordance with the relative velocity are added together is certainly present within the range of −d+nλ to +d+nλ. As a consequence, setting the inter-antenna element spacing d at 0.5λ or more enables the spectrum peak in the azimuth direction to be reliably obtained, and the relative velocity of the target is detectable.

The foregoing description reveals that the spectrum peak is reliably and readily obtainable by setting the inter-antenna element spacing d at 0.5λ or more. However, even if the inter-antenna element spacing d is below 0.5λ, the spectrum peak is also obtainable by virtually setting the inter-antenna element spacing d in terms of arithmetic of the Capon method or the Beamformer method.

In the Capon method, the Beamformer method, or other methods, a mode vector described below is used in the operation of an estimated arrival bearing.

[Expression 4]

$$a(\theta) = \begin{bmatrix} \exp\left(-j\frac{2\pi}{\lambda}d_1\sin\theta\right), \\ \exp\left(-j\frac{2\pi}{\lambda}d_2\sin\theta\right), \ldots, \\ \exp\left(-j\frac{2\pi}{\lambda}d_k\sin\theta\right) \end{bmatrix}^T \quad \text{(Expression A)}$$

Here, α(θ) represents the mode vector to the estimated azimuth θ and d1 to dk represent the spacing from one of the antenna elements that is set as the reference position to the other antenna elements, where the number of the antenna elements is k+1.

When the inter-antenna element spacing d is below 0.5λ, the virtually set inter-antenna element spacing d' is used without the use of the actual inter-antenna element spacing d in d1 to dk in (Expression A).

Figure 9A:
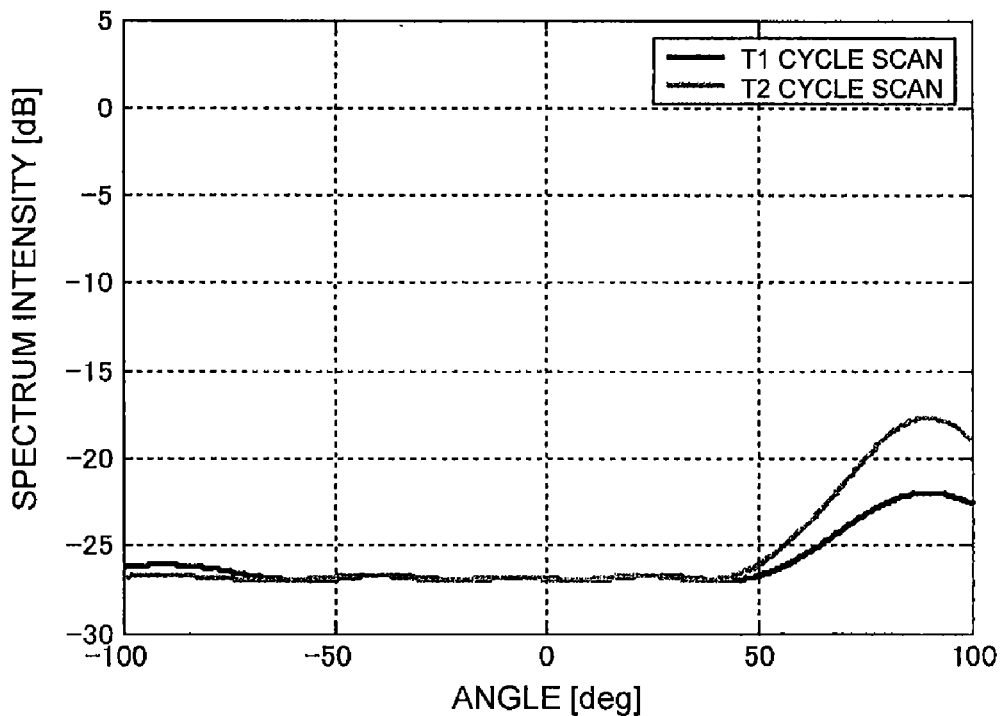
FIGS. 9(A) and 9(B) illustrate a directional spectrum.
Figure 9B:
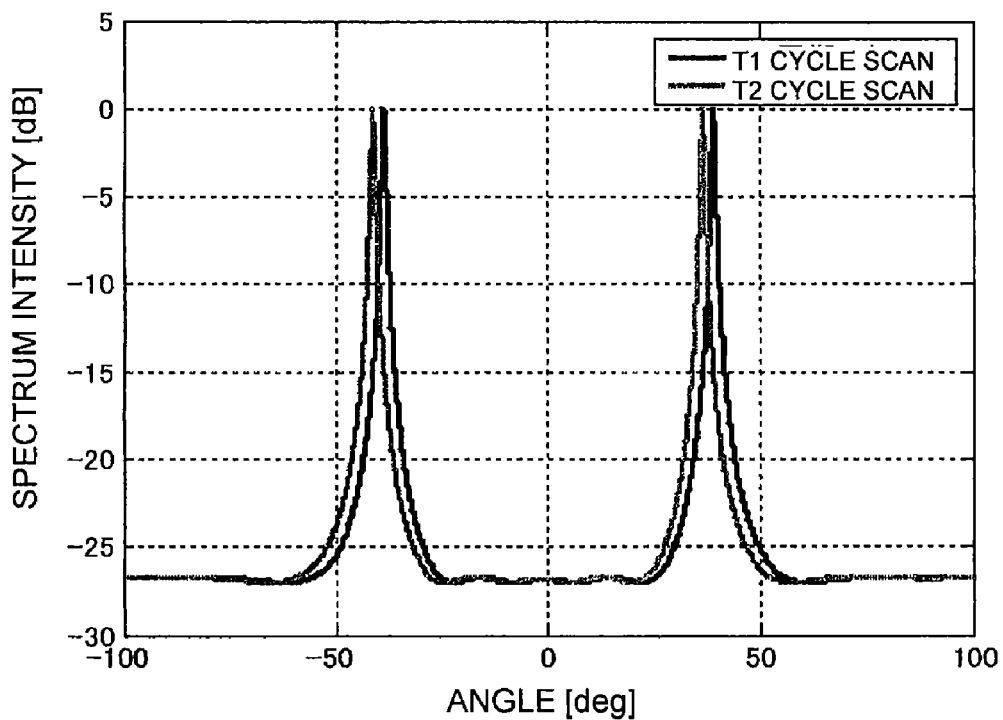

Such computation provides the directional spectrum illustrated in FIG. 9(B).

FIGS. 9(A) and 9(B) are illustrations that show a directional spectrum; FIG. 9(A) illustrates the case where the actual inter-antenna element spacing d=0.4λ is used and 9(B) illustrates the case where the virtually set inter-antenna element spacing d'=2d=0.8λ is used.

The directional spectrum illustrated in FIG. 9(A) is the one obtained under the same condition as that for the directional spectrum illustrated in FIG. 8(B). That is, FIG. 9(A) and FIG. 8(B) illustrate the same result.

As illustrated in FIG. 9(B), when the inter-antenna element spacing d' is virtually set at 0.5λ or more, an acute spectrum peak is obtainable.

In such a way, even if the inter-antenna element spacing d is below 0.5λ, the spectrum peak is obtainable by virtually setting the inter-antenna element spacing at 0.5λ or more without being affected by the relative velocity.

The azimuth $\theta_1'$ in the first measurement phase and the azimuth $\theta_2'$ in the second measurement phase in such a way are different from the actual azimuth θ. However, the actual azimuth θ and the calculated azimuth θ have a relationship given by:

$$L = d \cdot \sin\theta = d' \cdot \sin\theta'$$

where the distance to the equiphase wave surface is L.

Therefore, the actual azimuth θ is obtainable from the following expression:

$$\theta = \sin^{-1}((d'/d) \cdot \sin\theta') \quad \text{(Expression B)}$$

In such a way, in actuality, even if the inter-antenna element spacing d is below 0.5λ, when the inter-antenna element spacing d' is virtually set at 0.5λ or more, in terms of arithmetic operation, although the number of operands to be processed is increased, the azimuth θ is obtainable. As a consequence, the relative velocity V can be calculated using the calculated azimuths θ1 and θ2 in the measurement phases.

Next, a radar device and a method for detecting a target for use in a radar device according to a second embodiment are described with reference to the drawings.

The radar device according to the present embodiment is the same as that of the radar device according to the first embodiment, except for the inter-antenna element spacing d.

In the present embodiment, the true azimuth θ of the target is calculated, as well as the relative velocity V of the target. A method for calculating the true azimuth θ is specifically described below.

When the relative velocity of the target is increased, the distance difference r caused by the relative velocity between the neighboring antenna elements is also increased. In general, when it is designed such that the distance difference r caused by the relative velocity is within the range of −λ/2 to +λ/2, there are no ambiguities. However, when the distance difference r caused by the relative velocity is outside the range of −λ/2 to +λ/2, it is difficult to discriminate between r and r+nλ (n is an integer).

In this case, when the first azimuth in the first measurement phase is $\theta_1$, the following relationship is established:

$$L + 2r_1 + n\lambda = -d \cdot \sin\theta_1 \quad (10)$$

where n is any integer.

There are a plurality of candidates for the azimuth that have such combinations. Here, where the relative velocity of the target is V, the relationships relating to the true azimuth θ are given by:

$$r_1 = V \cdot T_1 \quad (11\text{-}1)$$

$$L = -d \cdot \sin\theta \quad (11\text{-}2)$$

Therefore, the following expression is obtainable from expressions (10), (11-1), and (11-2).

[Expression 5]

$$\sin\theta = \sin\theta_1 + \frac{2vt}{d} + n\frac{\lambda}{d} \quad (12)$$

Accordingly, expression (12) reveals that a candidate for the sine value sin θ of the true azimuth θ is present at intervals of λ/d.

In such a way, because the sine value sin θ is present at intervals of λ/d, in order to identify sin θ, it is necessary to limit a possible value of θ to the value satisfying the expression below.

[Expression 6]

$$|\sin\theta_{max} - \sin\theta_{min}| < \frac{\lambda}{d} \quad (13)$$

where the minimum value is $\theta_{min}$, and the maximum value is $\theta_{max}$ within the range of −90° to +90° when the front direction of the radar, i.e., the direction that is perpendicular to the direction of arrangement of the antenna elements and that is the direction of transmission of a transmission signal is 0°.

Therefore, the unique candidate can be determined, so the true azimuth can be identified.

Accordingly, the true azimuth θ can be calculated reliably and readily by setting the inter-antenna element spacing d at a value that satisfies the following expression:

[Expression 7]

$$d < \frac{\lambda}{|\sin\theta_{max} - \sin\theta_{min}|} \quad (14)$$

At this time, the relative velocity V can be calculated by the performance of the operation described in the above embodiment using sin $\theta_1$ and sin $\theta_2$ used in the calculation of the true azimuth θ.

Figure 10:
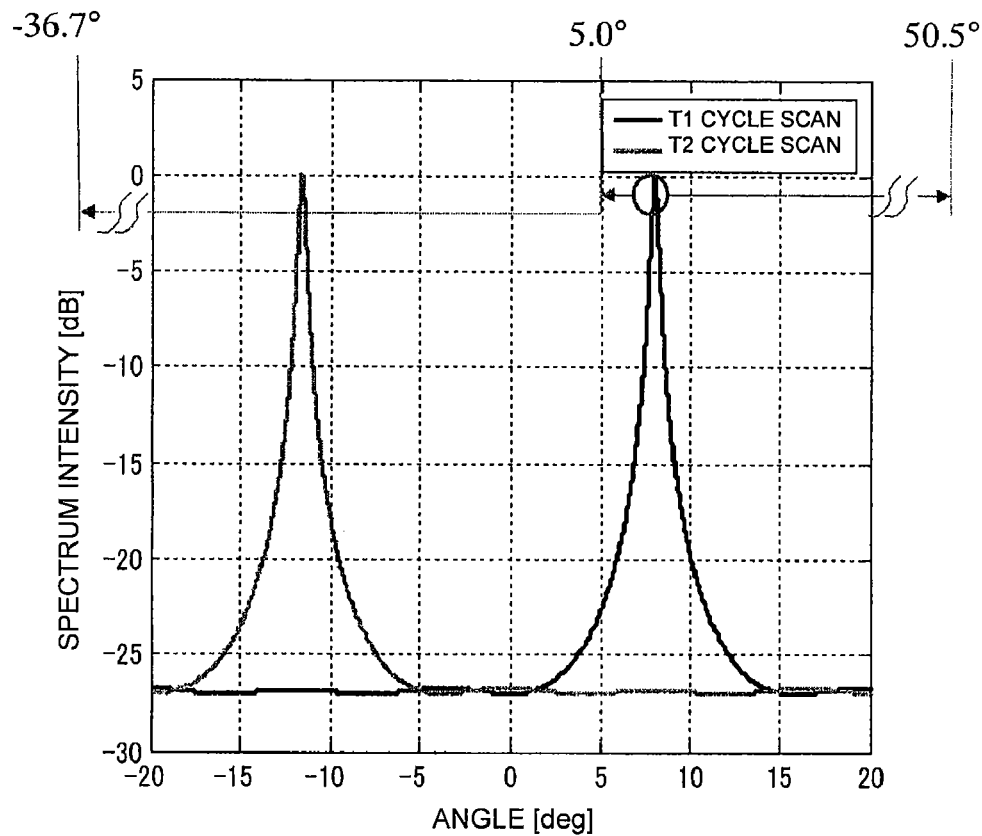
FIG. 10 illustrates one example of a directional spectrum obtained by a configuration and processing according to a second embodiment.

FIG. 10 illustrates one example of a directional spectrum obtained by the configuration and processing according to the present embodiment. The directional spectrum illustrated in FIG. 10 is the result of a simulation performed when the frequency of a transmission signal is 76 GHz, the wavelength λ=3.9 mm, the switching cycle $T_1$ in the first measurement phase is 1 msec, the switching cycle $T_2$ in the second measurement phase is 1.05 msec, the azimuth θ of the target is 5°, and the relative velocity of the target is 70 km/h.

Figure 11:
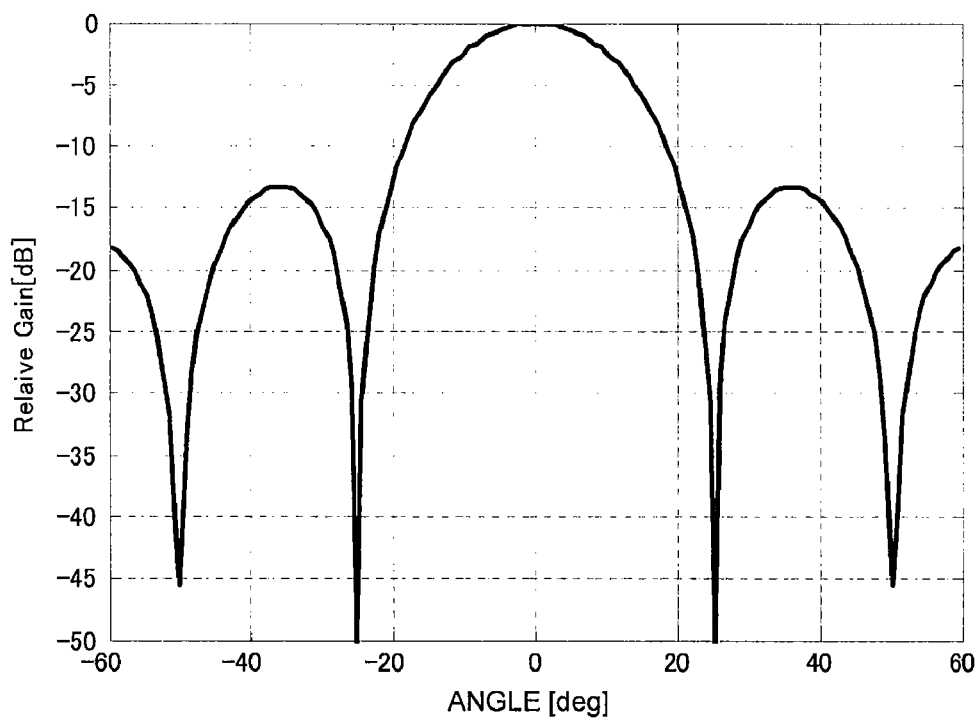
FIG. 11 illustrates a transmission and reception beam pattern according to the second embodiment.

The inter-antenna element spacing d is determined as being 1.46λ by setting $\theta_{max}$ at +20° and $\theta_{min}$ at −20° from expression (14), and here, is set at d=1.46λ as a boundary value. To achieve $\theta_{max}$=20° and $\theta_{min}$=−20°, for the radar device according to the present embodiment, for example, a transmission/reception beam pattern that has directional characteristics illustrated in FIG. 11 is formed. FIG. 11 is an illustration that shows the transmission/reception beam pattern according to the present embodiment. The transmission/reception beam pattern like this can be set by the configuration of the transmission antenna and the reception antenna and transmission and reception control.

As illustrated in FIG. 10, the use of the inter-antenna element spacing d in the present embodiment results in the presence of only one value within the range of $\theta_{max}$ to $\theta_{min}$ among values of θ obtained by substitution of the first azimuth $\theta_1$ in the first measurement phase into expression (12). Similarly, there is only one value of θ within the range of $\theta_{max}$ to $\theta_{min}$ obtained by use of the second azimuth $\theta_2$ in the second measurement phase instead of θ1 of expression (12). The relative velocity candidate V can be calculated using previously described expression (1) from sin $\theta_1$ and sin $\theta_2$. Specifically, in the example of FIG. 10, because $\theta_1$=7.96° and $\theta_2$=−1.620, the relative velocity candidate V is 70.0±141.1×n km/h, and the value when n=0 is the same as the assumption. If a possible velocity of the target is within the range of −40 km/h to +100 km/h, the true relative velocity can be identified as 70 km/h.

Next, because the sine value sin θ of the true azimuth θ is present at intervals of λ/d, as shown in expression (12), from $\theta_1$=7.96°, candidates for the true azimuth θ within the range of −90° to +90° are −36.7°, +5.0°, and +50.5°. However, because the transmission beam range is set as the range of −20° to +20°, the true azimuth θ is uniquely determined as being 5.0°. This result is the same as the assumption.

As described above, the configuration and the performance of the processing according to the present embodiment enables the relative velocity of the target to be accurately detected with reliability.

In the present embodiment, the detection range is set as being $\theta_{min}$ to $\theta_{max}$. If the detection range is set as being the same range from the previously described 0° direction used as the center in both the positive and negative directions of the angle, the following expression

[Expression 8]

$$d < \frac{\lambda}{2 \cdot \sin\theta_{max}} \quad (15)$$

may also be used instead of expression (14).

Next, a radar device and a method for detecting a target for use in a radar device according to a third embodiment are described with reference to the drawings.

In the radar device according to the present embodiment, spacing between the antenna elements is not uniform. The other configuration thereof is the same as that of the radar device according to each of the first and second embodiments.

Figure 12A:
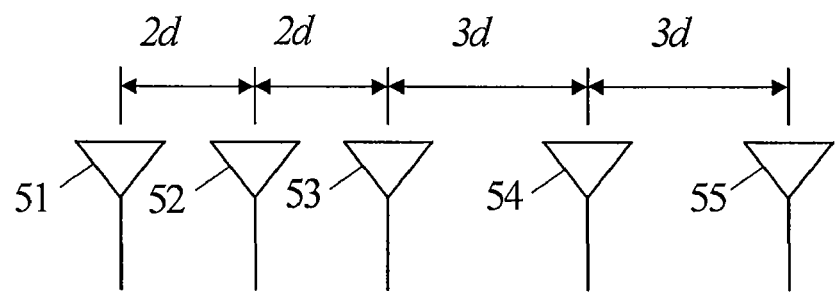
FIG. 12(A) illustrates spacing between antenna elements and FIG. 12(B) illustrates a synchronization state between transmission control and switching control.
Figure 12B:
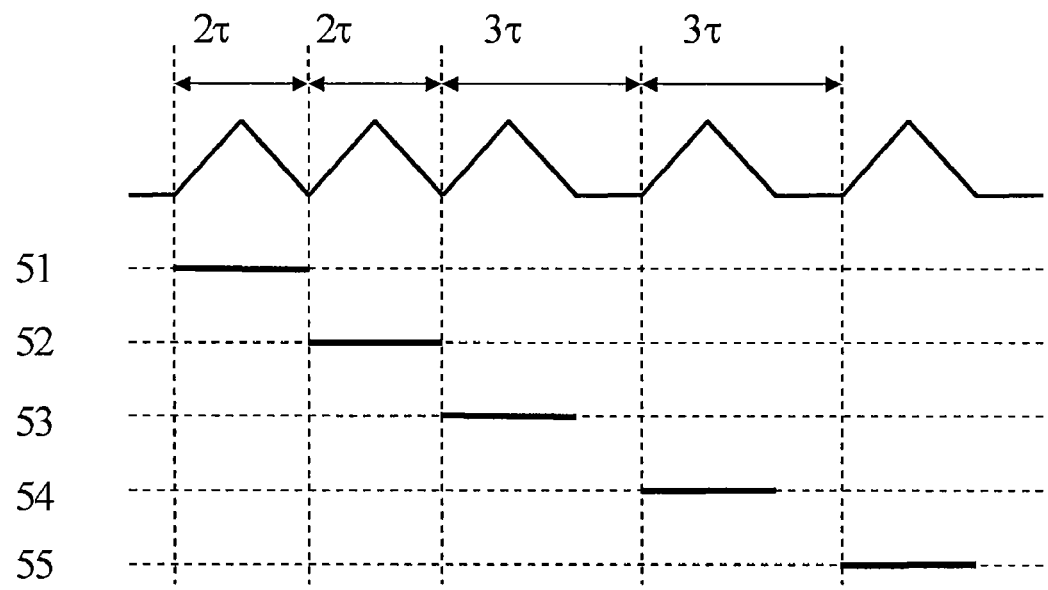

FIG. 12(A) is an illustration that shows spacing between the antenna elements; FIG. 12(B) is an illustration that shows a synchronization state between transmission control and switching control.

As illustrated in FIG. 12(A), in the radar device according to the present embodiment, the spacings between the neighboring antenna elements of the antenna elements 51 to 55 are 2d, 2d, 3d, and 3d in sequence from the antenna element 51. As illustrated in FIG. 12(B), when the antenna elements are switched in the order of the antenna elements 51 to 55, they are switched at τ=$T_1$, i.e., the time intervals 2$T_1$, 2$T_1$, 3$T_1$, and $3T_1$ in the case of the first measurement phase and at $T=T_2$, i.e., the time intervals $2T_2$, $2T_2$, $3T_2$, and $3T_2$ in the case of the second measurement phase.

In the case of an array antenna in which antenna elements are arranged at non-uniform intervals, the interval between the occurrences of grating lobes is determined by the greatest common divisor of the inter-antenna element spacings. Therefore, from the conditions described in the above first and second embodiments, when d is determined such that the following expression, the relative velocity V and true azimuth θ can be uniquely determined.

[Expression 9]

$$0.5\lambda < d < \frac{\lambda}{|\sin\theta_{max} - \sin\theta_{min}|} \quad (16)$$

where the greatest common divisor of the inter-antenna element spacings is d.

Alternatively, also when $d<0.5\lambda$, θ can be calculated from expression (B) using the previously described virtual spacing d' ($d'>0.5\lambda$) in exactly the same manner, and then the relative velocity V can be uniquely determined.

The use of such a configuration and processing improves azimuth resolution employing an array whose inter-antenna spacing is not uniform and enables the relative velocity V and the true azimuth θ to be detected with reliability. That is, the relative velocity V and the true azimuth θ are accurately detectable with reliability.

Next, a radar device and a method for detecting a target for use in a radar device according to a fourth embodiment are described.

In the present embodiment, the range of an azimuth computational angle estimated (estimated computational azimuth angle range) is set. The other configuration thereof is the same as that of the radar device according to the third embodiment.

When the estimated computational azimuth angle range is set as being $-\theta_{cal}$ to $+\theta_{cal}$, the maximum computational azimuth angle $\theta_{cal}$ is set as the following expression.

$$\theta_{cal} = \sin^{-1}(\lambda/(2d)) \quad (17)$$

This relational expression is derived from the above-described principle. When setting shown in expression (17) is performed, each of the first azimuth $\theta_1$ in the first measurement phase and the second azimuth $\theta_2$ in the second measurement phase has one spectrum peak. Therefore, the relative velocity V and the true azimuth θ can be calculated readily and reliably. In addition, in the present embodiment, the estimated azimuth angle range can be substantially narrower than that in the above embodiments. Accordingly, the load on computation in calculation of the relative velocity and the azimuth can be reduced.

Next, a radar device and a method for detecting a target for use in a radar device according to a fifth embodiment are described with reference to the drawings.

The present embodiment does not relate to processing for one target, as described in the above embodiments, but relates to processing for the case where there are a plurality of targets within the detection range at substantially the same distance from the device itself.

Figure 13:
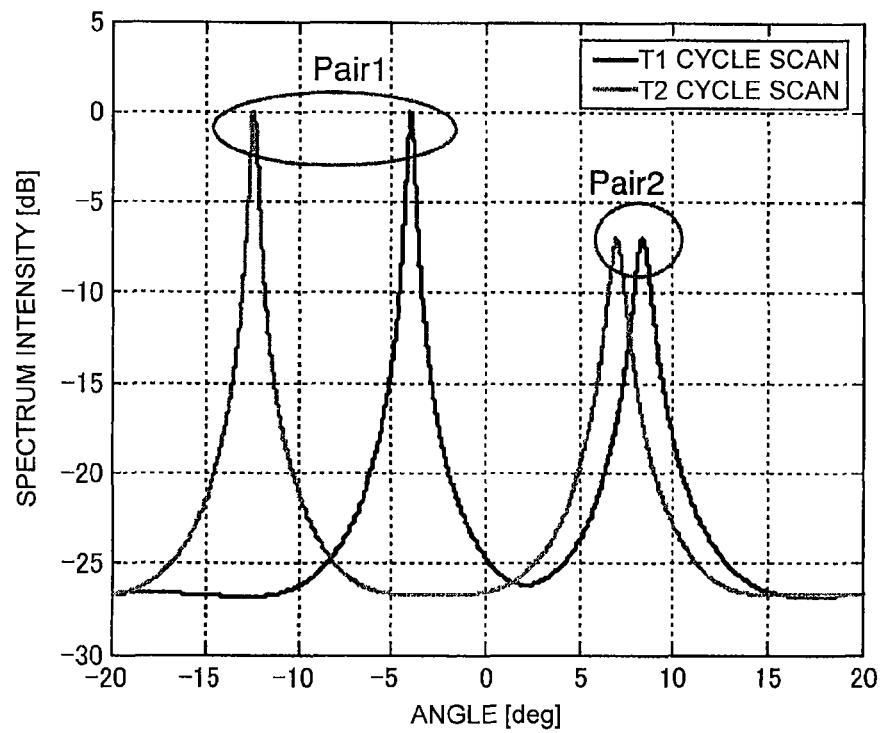
FIG. 13 illustrates directional spectrums when a plurality of targets are present in the same distance in different azimuths and have different relative velocities.

FIG. 13 is an illustration that shows directional spectrums when a plurality of targets exist at the same distance in different azimuths and have different relative velocities.

The level of the spectrum peak in accordance with a reception signal in a first measurement phase and that in a second measurement phase are substantially the same if the same target (single target) is to be detected. Therefore, the level of the spectrum peak varies from one target to another, and the level of the spectrum peak for the same target in the first measurement phase and that in the second measurement phase are substantially the same.

By utilizing this, the signal processor 1 pairs the spectrum peak in the first measurement phase and the spectrum peak in the second measurement phase on the basis of the peak level from the spectrum peaks. The signal processor 1 detects the relative velocity and the true azimuth for each target using the paired spectrum peak in the first measurement phase and spectrum peak in the second measurement phase by a variety of methods previously described. Even when there are a plurality of targets having different relative velocities and azimuths at the same distance from the device, the use of such a processing method enables the relative velocities and azimuths to be detected with reliability and high precision.

In this pairing, not only the level of the spectrum peak but also the shape of the spectrum peak may be referred to.

In addition, the spectrum peaks to be paired may also be determined by reduction in the interval time difference Δt by the method described below utilizing the fact that the phase difference between the first measurement phase and the second measurement phase is $2V\Delta t/\lambda$.

The upper limit of a possible relative velocity of the target is $V_{max}$ and the lower limit thereof is $V_{min}$. Here, because, when the interval time difference Δt is set under the condition described in the first embodiment, the phase difference does not exceed $2\pi$, from expression (1), with respect to the first azimuth $\theta_1$, it is necessary to detect $\theta_2$ such that the limit value $\sin\theta_2$ is within the range given below.

[Expression 10]

$$\left(\sin\theta_1 - \frac{2\Delta t \cdot V_{min}}{d}\right) \sim \left(\sin\theta_1 - \frac{2\Delta t \cdot V_{max}}{d}\right) \quad (18)$$

At this time, when there are a plurality of candidates for $\theta_2$ within the range of expression (18), pairing can be performed with reliability by setting the interval time difference Δt such that it gradually reduces to narrow down to one candidate for $\theta_2$.

This enables the relative velocity V to be calculated with reliability. One the relative velocity V has been calculated, it will be sufficient to increase the interval time difference Δt and improve resolution of the relative velocity thereafter. As a consequence, the relative velocity V can be calculated with reliability, while at the same time the relative velocity can be calculated gradually higher precision.

In the above embodiments, an example is described in which a triangular modulated signal is used, the antenna elements are switched in the order of 51, 52, 53, 54, and 55 at the switching cycle $T_1$ in a first measurement phase, and the antenna elements are switched in the order of 51, 52, 53, 54, and 55 at the switching cycle $T_2$ in a second measurement phase.

However, the above-described configuration and processing can be achieved even with transmission signal waveforms and switching of antenna elements illustrated in FIGS. 14 to 17 and thus the above-described advantages can be provided.

FIGS. 14 to 17 are illustrations that show other transmission signal waveforms and a synchronization state between transmission control and switching control.

Figure 14:
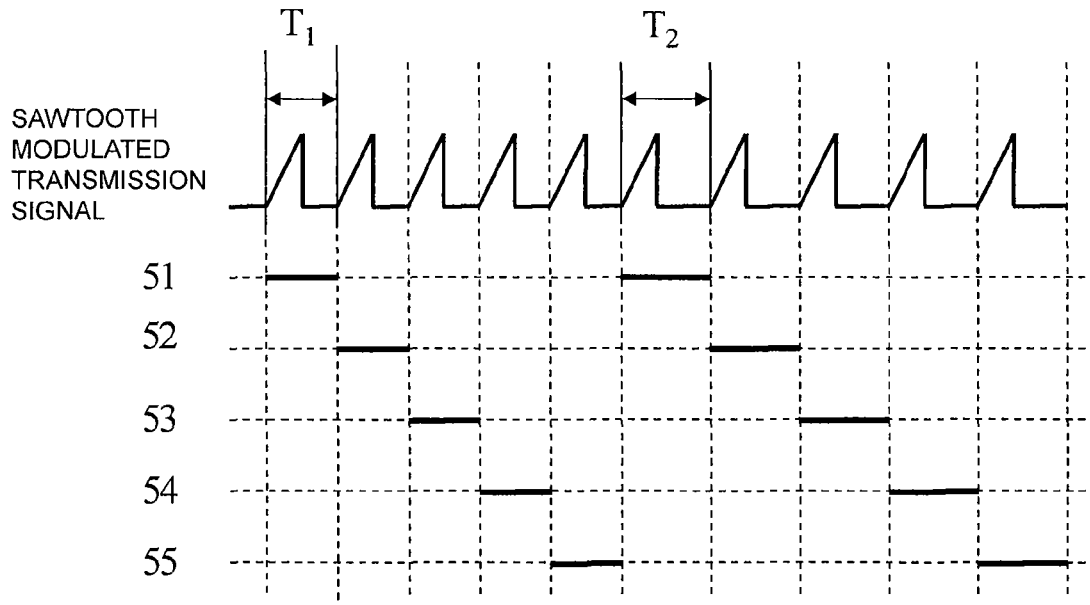
FIG. 14 is illustration that shows another wave form of a transmission signal and a synchronization state between transmission control and switching control.

FIG. 14 illustrates the case where a modulated signal having only a rising modulated section, what is called, a sawtooth waveform is used. The waveforms in the modulated sections are the same, whereas the length of unmodulated sections in a first measurement phase and that in a second measurement phase are different.

Figure 15:
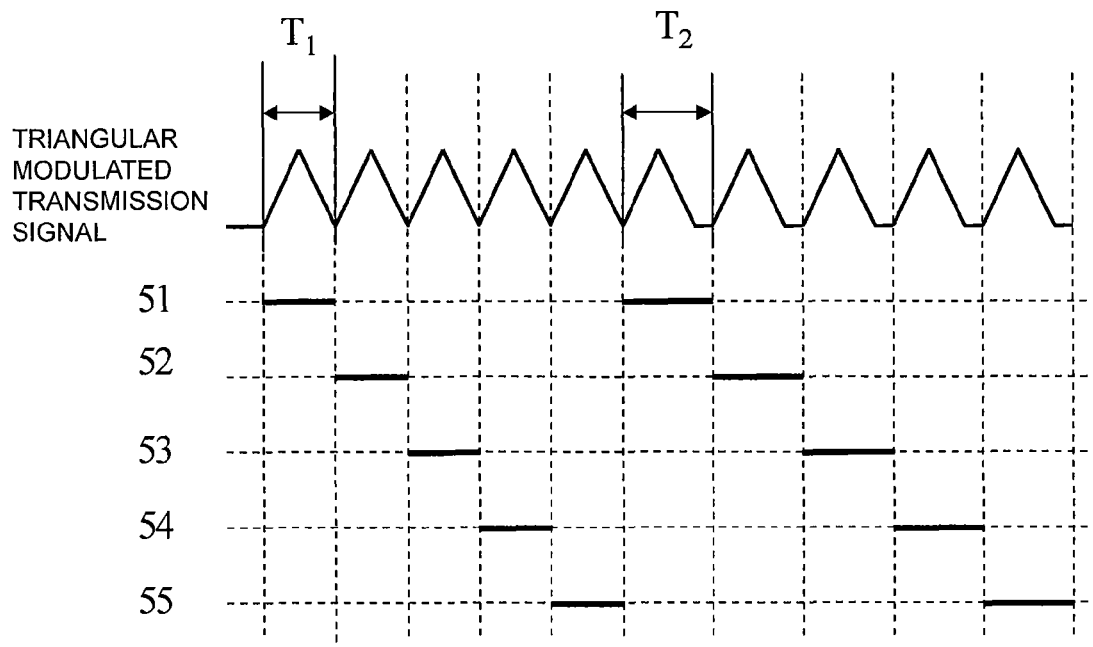
FIG. 15 is illustration that shows still another wave form of a transmission signal and a synchronization state between transmission control and switching control.

FIG. 15 illustrates the case where a triangular modulated signal is used. There are no unmodulated sections in a first measurement phase, whereas there are unmodulated sections in a second measurement phase.

Figure 16:
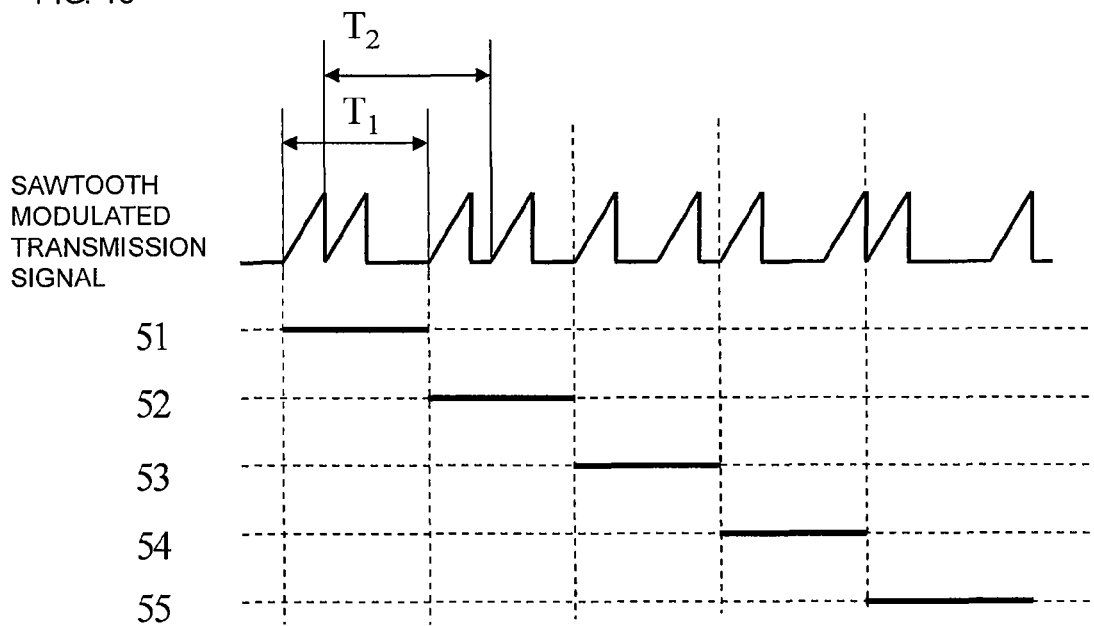
FIG. 16 is illustration that shows yet another wave form of a transmission signal and a synchronization state between transmission control and switching control.

FIG. 16 illustrates the case where a sawtooth modulated signal is used. There are two modulated sections in a single transmission cycle. The interval between the two modulated sections in the single transmission cycle varies from one transmission cycle to another. At this time, switching the antenna elements 51 to 55 is controlled by transmission cycle. The first measurement phase consists of a sawtooth modulated signal corresponding to an initial (first) modulated section in a transmission cycle where each of the antenna elements 51 to 55 receives a signal, whereas the second measurement phase consists of a sawtooth modulated signal corresponding to a second modulated section in the transmission cycle where each of the antenna elements 51 to 55 receives a signal.

Figure 17:
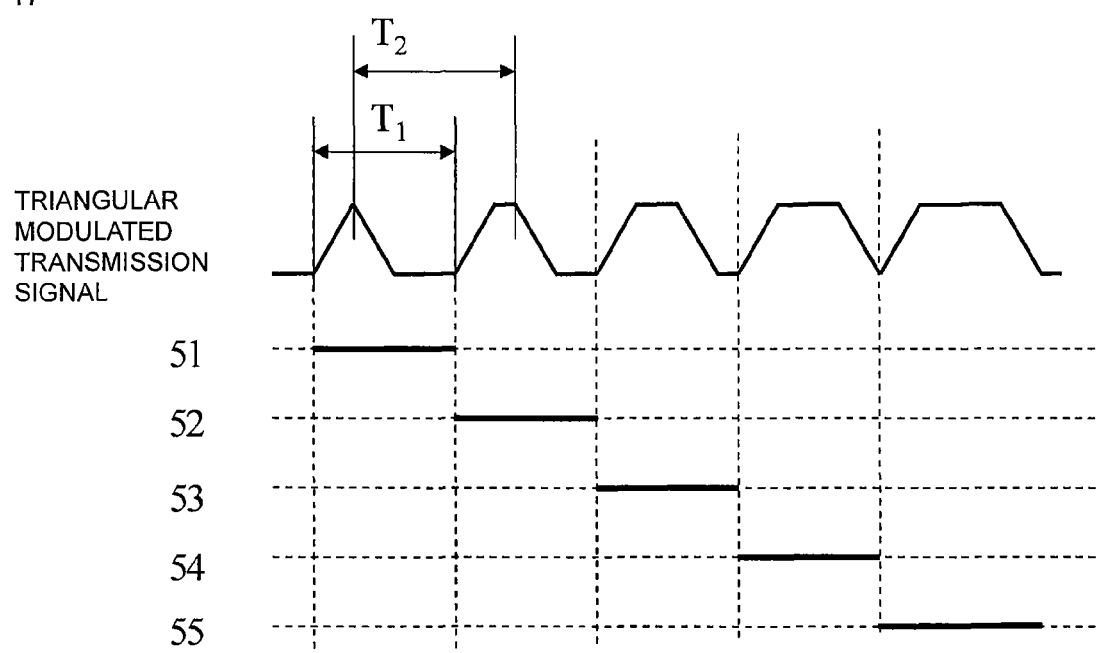
FIG. 17 is illustration that shows another wave form of a transmission signal and a synchronization state between transmission control and switching control.

FIG. 17 illustrates the case where a triangular modulated signal that has a rising modulated section and a falling modulated section is used. The triangular modulated signal has a non-modulated section between the rising modulated section and the falling modulated section. The non-modulated section varies from one triangular modulated signal to another.

The first measurement phase consists of a signal in a rising modulated section in a triangular modulated signal received by each of the antenna elements 51 to 55, whereas the second measurement phase consists of a signal in a falling modulated section in the triangular modulated signal received by each of the antenna elements 51 to 55.

In the above embodiments, the reception antenna is an array antenna in which a plurality of antenna elements are arranged by way of example. However, the transmission antenna may be the array antenna, or alternatively, each of the transmission antenna and the reception antenna may be the array antenna. The above-described advantages can also be provided.

The invention claimed is:

1. A target detection method for use in a radar, the radar including a transmission antenna and a reception antenna, at least one of the transmission antenna and the reception antenna including a plurality of antenna elements arranged in a straight line, the target detection method comprising:
  switching, in a first measurement phase, the plurality of antenna elements at first time intervals on the basis of a preset predetermined switching pattern;
  calculating a first azimuth of a target based on the first measurement phase;
  switching, in a second measurement phase, the plurality of antenna elements at second time intervals different from the first time intervals on the basis of the predetermined switching pattern;
  calculating a second azimuth of the target based on the second measurement phase; and
  calculating a velocity of the target relative to the radar on the basis of the first azimuth, the second azimuth, each of the first time intervals, each of the second time intervals, and a spacing between the plurality of antenna elements.

2. The target detection method for use in a radar according to claim 1, wherein the steps of switching the plurality of antenna elements is conducted in synchronization with a modulation cycle of a transmission signal.

3. The target detection method for use in a radar according to claim 1, further comprising selecting one from one or more candidates to calculate the relative velocity of the target, the candidates being obtained using the following expression:

$$V = d \cdot (\sin\theta_1 - \sin\theta_2)/(2 \cdot \Delta t) + n \cdot \lambda/(2 \cdot \Delta t)$$

where a direction perpendicular to an arrangement direction in which the plurality of antenna elements are arranged adjacent to a radiation direction of the transmission signal is 0° direction, $\theta_1$ and $\theta_2$ are the first azimuth and the second azimuth, respectively, extending from the 0° direction to the arrangement direction within a range of −90° to +90°, $\Delta t$ is an interval time difference between the first time interval and the second time interval, d is the spacing between the plurality of antenna elements, V is the candidates for the relative velocity of the target, and n is any integer.

4. The target detection method for use in a radar according to claim 3, further comprising setting the interval time difference $\Delta t$ between the first time interval and the second time interval in a variable manner.

5. The target detection method for use in a radar according to claim 1, further comprising setting the interval time difference $\Delta t$ between the first time interval and the second time interval such that the following expression is satisfied:

$$\Delta t < \lambda/(2|V_{max} - V_{min}|d)$$

where a possible relative velocity of the target to be detected is in a range of $V_{min}$ to $V_{max}$, $\Delta t$ is the interval time difference between the first time interval and the second time interval, and $\lambda$ is a wavelength of a transmission/reception signal.

6. The target detection method for use in a radar according to claim 1, further comprising setting the spacing between the antenna elements such that the following expression is satisfied:

$$d < \lambda/|\sin\theta_{max} - \sin\theta_{min}|$$

where a direction perpendicular to an arrangement direction in which the plurality of antenna elements are arranged adjacent to a radiation direction of the transmission signal is 0° direction, a detection azimuth angle range of $\theta_{min}$ to $\theta_{max}$ extending from the 0° direction to the arrangement direction is set within a range of −90° to +90°, d is the spacing between the plurality of antenna elements, and $\lambda$ is a wavelength of a transmission/reception signal.

7. The target detection method for use in a radar according to claim 6, wherein the plurality of antenna elements are arranged at unequal intervals, and the greatest common divisor of the unequal intervals is matched to the spacing d.

8. The target detection method for use in a radar according to claim 1, further comprising calculating the relative velocity and azimuth of the target in a calculation azimuth angle range specified by the following expression:

$$\theta_{cal} = \sin^{-1}(\lambda/(2d))$$

where a direction perpendicular to an arrangement direction in which the plurality of antenna elements are arranged adjacent to a radiation direction of the transmission signal is 0° direction, the calculation azimuth angle range containing the 0° direction is set as a range of $-\theta_{cal}$ to $+\theta_{cal}$, d is the spacing between the plurality of antenna elements, and $\lambda$ is a wavelength of a transmission/reception signal.

9. The target detection method for use in a radar according to claim 1, further comprising, when the spacing d between the plurality of antenna elements is smaller than 0.5λ with respect to the wavelength λ of the transmission/reception signal, setting the spacing d between the plurality of antenna elements at 0.5λ or more in calculating each azimuth to calculate an estimated azimuth; and correcting the calculated azimuth so as to correspond to a state in which the spacing d between the plurality of antenna elements is smaller than 0.5λ to calculate the azimuth.

10. A radar device comprising:

a transmission antenna and a reception antenna, at least one of the transmission antenna and the reception antenna including a plurality of antenna elements arranged in a straight line;

a switching unit that switches the plurality of antenna elements arranged in the straight line in synchronization with a modulation cycle of a transmission signal; and a target detecting unit that detects a target from an obtained reception signal, wherein the target detecting unit calculates a first azimuth of the target in a first measurement phase in which the plurality of antenna elements are switched at first time intervals on the basis of a preset predetermined switching pattern, the target detecting unit calculates a second azimuth of the target in a second measurement phase in which the plurality of antenna elements are switched at second time intervals different from the first time intervals on the basis of the predetermined switching pattern, and the target detecting unit calculates a velocity of the target relative to the radar device on the basis of the first azimuth, the second azimuth, each of the first time intervals, each of the second time intervals, and a spacing between the plurality of antenna elements.

11. The radar device according to claim 10, wherein the target detecting unit selects one from one or more candidates to calculate the relative velocity of the target, the candidates being obtained using the following expression:

$$V = d \cdot (\sin\theta_1 - \sin\theta_2)/(2 \cdot \Delta t) + n \cdot \lambda/(2 \cdot \Delta t)$$

where a direction perpendicular to an arrangement direction in which the plurality of antenna elements are arranged adjacent to a radiation direction of the transmission signal is 0° direction, $\theta_1$ and $\theta_2$ are the first azimuth and the second azimuth, respectively, extending from the 0° direction to the arrangement direction within a range of −90° to +90°, Δt is an interval time difference between the first time interval and the second time interval, d is the spacing between the plurality of antenna elements, V is the candidates for the relative velocity of the target, and n is any integer.

12. The radar device according to claim 11, wherein the target detecting unit performs control of making the interval time difference Δt between the first time interval and the second time interval variable on the switching unit.

13. The radar device according to claim 10, wherein the switching unit sets the interval time difference Δt between each of the first time intervals and each of the second time intervals such that the following expression is satisfied:

$$\Delta t < \lambda/(2|V_{max} - V_{min}|)$$

where a possible relative velocity of the target to be detected is in a range of $V_{min}$ to $V_{max}$, Δt is the interval time difference between the first time interval and the second time interval, and λ is a wavelength of a transmission/reception signal.

14. The radar device according to claim 10, wherein the spacing between the plurality of antenna elements satisfies the following expression:

$$d < \lambda/|\sin\theta_{max} - \sin\theta_{min}|$$

where a direction perpendicular to an arrangement direction in which the plurality of antenna elements are arranged adjacent to a radiation direction of the transmission signal is 0° direction, a detection azimuth angle range of $\theta_{min}$ to $\theta_{max}$ extending from the 0° direction to the arrangement direction is set within a range of −90° to +90°, d is the spacing between the plurality of antenna elements, and λ is a wavelength of a transmission/reception signal.

15. The radar device according to claim 14, wherein the spacing d between the plurality of antenna elements is smaller than 0.5λ with respect to the wavelength λ of the transmission/reception signal, and the target detecting unit sets the spacing d between the plurality of antenna elements at 0.5λ or more in calculating each azimuth to calculate an estimated azimuth and corrects the calculated azimuth so as to correspond to the state in which the spacing d between the plurality of antenna elements is smaller than 0.5λ to calculate the azimuth.

16. The radar device according to claim 14, wherein the plurality of antenna elements are arranged at unequal intervals, and the greatest common divisor of the unequal intervals is matched to the spacing d.

17. The radar device according to claim 10, wherein the target detecting unit calculates the relative velocity and azimuth of the target in a calculation azimuth angle range specified by the following expression:

$$\theta_{cal} = \sin^{-1}(\lambda/(2d))$$

where a direction perpendicular to an arrangement direction in which the plurality of antenna elements are arranged adjacent to a radiation direction of the transmission signal is 0° direction, the calculation azimuth angle range containing the 0° direction is set as a range of $-\theta_{cal}$ to $+\theta_{cal}$, d is the spacing between the plurality of antenna elements, and λ is a wavelength of a transmission/reception signal.

* * * * *